(12) United States Patent
Ortiz, Jr. et al.

(10) Patent No.: US 9,479,931 B2
(45) Date of Patent: Oct. 25, 2016

(54) SYSTEMS AND METHODS FOR PROVIDING A VIRTUAL ASSISTANT

(71) Applicant: Nuance Communications, Inc., Burlington, MA (US)

(72) Inventors: Charles L. Ortiz, Jr., Fremont, CA (US); Kenneth S. Harper, Hudson, NH (US); Holger Quast, Merelbeke (BE); Sean P. Brown, San Francisco, CA (US)

(73) Assignee: Nuance Communications, Inc., Burlington, MA (US)

( * ) Notice: Subject to any disclaimer, the term of this patent is extended or adjusted under 35 U.S.C. 154(b) by 174 days.

(21) Appl. No.: 14/107,466

(22) Filed: Dec. 16, 2013

(65) Prior Publication Data

US 2015/0172262 A1    Jun. 18, 2015

(51) Int. Cl.
| | | |
|---|---|---|
| G06F 17/00 | (2006.01) | |
| G06N 5/00 | (2006.01) | |
| H04W 12/04 | (2009.01) | |
| G06N 99/00 | (2010.01) | |
| G06F 9/44 | (2006.01) | |

(52) U.S. Cl.
CPC ........... *H04W 12/04* (2013.01); *G06N 99/005* (2013.01); *G06F 9/4446* (2013.01)

(58) Field of Classification Search
None
See application file for complete search history.

(56) References Cited

U.S. PATENT DOCUMENTS

| | | |
|---|---|---|
| 6,493,428 B1 | 12/2002 | Hillier |
| 6,853,716 B1 | 2/2005 | Shaffer |
| 6,920,425 B1 | 7/2005 | Will et al. |
| 8,000,454 B1 | 8/2011 | Or-Bach et al. |
| 8,204,184 B2 | 6/2012 | Gao et al. |
| 8,489,399 B2 | 7/2013 | Gross |
| 2002/0143533 A1 | 10/2002 | Lucas et al. |
| 2003/0149758 A1 | 8/2003 | Riche et al. |
| 2004/0225650 A1 | 11/2004 | Cooper et al. |
| 2007/0043687 A1 | 2/2007 | Bodart et al. |
| 2007/0225984 A1 | 9/2007 | Milstein et al. |
| 2009/0018835 A1 | 1/2009 | Cooper et al. |
| 2009/0271826 A1 | 10/2009 | Lee et al. |
| 2010/0281427 A1* | 11/2010 | Ghosh ................. G06F 21/6263 715/811 |
| 2012/0010887 A1 | 1/2012 | Boregowda et al. |
| 2012/0059810 A1 | 3/2012 | Sejnoha et al. |
| 2012/0222069 A1 | 8/2012 | Chavez |
| 2013/0332521 A1 | 12/2013 | Olague et al. |
| 2013/0332839 A1 | 12/2013 | Frazier et al. |

(Continued)

FOREIGN PATENT DOCUMENTS

WO  PCT/US2013/075457    12/2013

OTHER PUBLICATIONS

U.S. Appl. No. 14/107,499, filed Dec. 16, 2013, Quast et al.

(Continued)

*Primary Examiner* — Li-Wu Chang
(74) *Attorney, Agent, or Firm* — Wolf, Greenfield & Sacks, P.C.

(57) ABSTRACT

A mobile device comprising at least one computer-readable storage medium configured to store user profile information of a user of the mobile device; and at least one processor, coupled to the at least one computer-readable storage medium, configured to perform an act of: providing a second device, which is configured to execute a first virtual assistant, with access to at least some of the user profile information so that the first virtual assistant is able to customize, based on the at least some user profile information, its behavior when interacting with the user.

15 Claims, 14 Drawing Sheets

(56) References Cited

U.S. PATENT DOCUMENTS

| | | | |
|---|---|---|---|
| 2014/0222569 A1* | 8/2014 | Kerr | C07K 14/705 705/14.58 |
| 2014/0282656 A1* | 9/2014 | Belyaev | H04N 21/25841 725/14 |
| 2015/0169284 A1 | 6/2015 | Harper et al. | |
| 2015/0169336 A1 | 6/2015 | Harper et al. | |
| 2015/0172463 A1 | 6/2015 | Quast et al. | |

OTHER PUBLICATIONS

U.S. Appl. No. 14/107,545, filed Dec. 16, 2013, Harper et al.
U.S. Appl. No. 14/107,622, filed Dec. 16, 2013, Quast et al.
International Search Report and Written Opinion for PCT/US2013/075457 mailed Jul. 29, 2014.
Park et al., A Context Aware DVB Recommendation System Based on Real-Time Adjusted User Profiles. Journal of KIISE. 2010;16(12):1244-48.

* cited by examiner

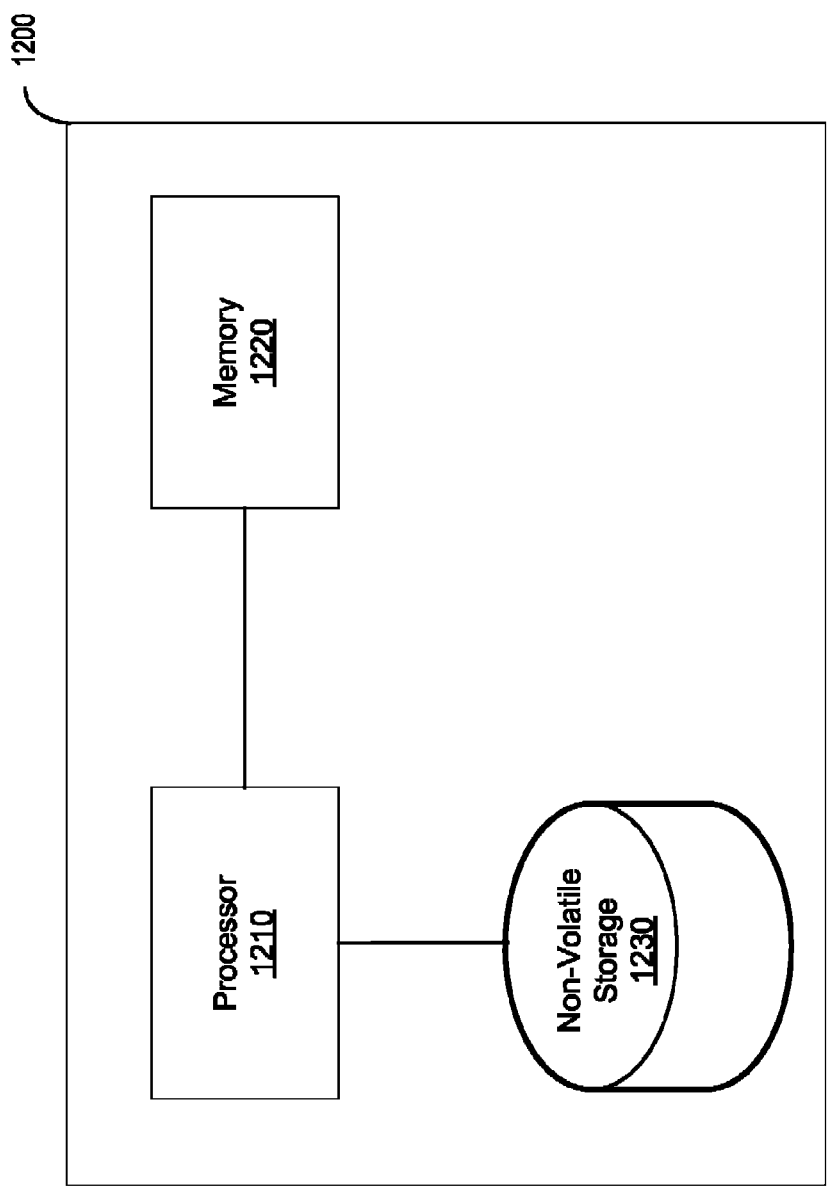

SYSTEMS AND METHODS FOR PROVIDING A VIRTUAL ASSISTANT

BACKGROUND

Virtual assistants provide a type of user interface that enables a person to interact with a computing device (e.g., a smart phone or other computing device). A virtual assistant may be configured to simulate a person, in some respects, so that the person interacting with the computing device with the help of a virtual assistant may have an experience similar to interacting with another person rather than a machine. For example, the virtual assistant may allow the person to interact with the computing device by speaking to provide voice input to the virtual assistant. A conventional virtual assistant may interpret the voice input provided by the user, perform one or more actions based on the user's input, and "talk" back to the user by using a voice interface.

SUMMARY

Some embodiments provide for a system, comprising: at least one computer-readable storage medium configured to store a plurality of user profiles including a first user profile of a first user; and at least one processor, coupled to the at least one computer-readable storage medium, configured to perform acts of: receiving a first request to access the first user profile from a first device configured to execute a first virtual assistant to interact with the first user; in response to receiving the first request, providing the first device with access to at least some information in the first user profile so that the first virtual assistant is able to customize, based on the at least some accessed information, its behavior when interacting with the first user; receiving a second request to access the first user profile from a second device configured to execute a second virtual assistant to interact with the first user; and in response to receiving the second request, providing the second device with access to the at least some information so that the second virtual assistant is able to customize, based on the at least some accessed information, its behavior when interacting with the first user.

Some embodiments provide for a method, comprising using at least one processor to perform acts of: receiving a first request to access a first user profile of a first user from a first device configured to execute a first virtual assistant to interact with the first user; in response to receiving the first request, providing the first device with access to at least some information in the first user profile so that the first virtual assistant is able to customize, based on the at least some accessed information, its behavior when interacting with the first user; receiving a second request to access the first user profile from a second device configured to execute a second virtual assistant to interact with the first user; and in response to receiving the second request, providing the second device with access to the at least some information so that the second virtual assistant is able to customize, based on the at least some accessed information, its behavior when interacting with the first user.

Some embodiments provide for at least one non-transitory computer-readable storage medium storing processor-executable instructions that, when executed by at least one processor, cause the at least one processor to perform a method comprising: receiving a first request to access a first user profile of a first user from a first device configured to execute a first virtual assistant to interact with the first user; in response to receiving the first request, providing the first device with access to at least some information in the first user profile so that the first virtual assistant is able to customize, based on the at least some accessed information, its behavior when interacting with the first user; receiving a second request to access the first user profile from a second device configured to execute a second virtual assistant to interact with the first user; and in response to receiving the second request, providing the second device with access to the at least some information so that the second virtual assistant is able to customize, based on the at least some accessed information, its behavior when interacting with the first user.

Some embodiments provide for a device comprising at least one processor configured to implement a virtual assistant, the at least one processor configured to perform acts of: accessing, by communicating with at least one computer that is distinct from the device, at least some information in a profile of a first user, and customizing the behavior of the virtual assistant based on at least some of the accessed information in the profile of the first user.

Some embodiments provide for a method for implementing a virtual assistant, the method comprising using at least one processor to perform acts of: accessing, by communicating with at least one computer that is distinct from the device, at least some information in a profile of a first user, and customizing the behavior of the virtual assistant based on at least some of the accessed information in the profile of the first user.

Some embodiments provide for at least one non-transitory computer-readable storage medium storing processor executable instructions that, when executed by at least one processor, cause the at least one processor to perform a method for implementing a virtual assistant, the method comprising: accessing, by communicating with at least one computer that is distinct from the device, at least some information in a profile of a first user, and customizing the behavior of the virtual assistant based on at least some of the accessed information in the profile of the first user.

Some embodiments provide for a mobile device, comprising at least one computer-readable storage medium configured to store user profile information of a user of the mobile device; and at least one processor, coupled to the at least one computer-readable storage medium, configured to perform an act of: providing a second device, which is configured to execute a first virtual assistant, with access to at least some of the user profile information so that the first virtual assistant is able to customize, based on the at least some user profile information, its behavior when interacting with the user.

Some embodiments provide for a method performed by a mobile device, the mobile device configured to store user profile information of a user of the mobile device, the method comprising: providing a second device, which is configured to execute a first virtual assistant, with access to at least some of the user profile information so that the first virtual assistant is able to customize, based on the at least some user profile information, its behavior when interacting with the user.

Some embodiments provide for at least one non-transitory computer-readable storage medium storing processor-executable instructions that, when executed by a mobile device configured to store user profile information of a user of the mobile device, cause the mobile device to perform a method comprising: providing a second device, which is configured to execute a first virtual assistant, with access to at least some of the user profile information so that the first virtual assistant is able to customize, based on the at least some user profile information, its behavior when interacting with the user.

Some embodiments provide for a device, comprising at least one processor configured to implement a virtual assistant, the at least one processor configured to perform acts of: receiving, from a mobile device configured to store user profile information of a user of the mobile device, at least some of the user profile information; and customizing the behavior of the virtual assistant based on at least some of the received information.

Some embodiments provide for a method comprising: using at least one processor to perform acts of: receiving, from a mobile device configured to store user profile information of a user of the mobile device, at least some of the user profile information; and customizing the behavior of a virtual assistant based on at least some of the received information.

Some embodiments provide for at least one non-transitory computer-readable storage medium storing processor-executable instructions that, when executed by at least one processor, cause the at least one processor to perform a method comprising: receiving, from a mobile device configured to store user profile information of a user of the mobile device, at least some of the user profile information; and customizing the behavior of a virtual assistant based on at least some of the received information.

Some embodiments provide for a method, performed by at least one computer having access to information related to users in a network of users, the network of users comprising a first user and at least a second user associated with the first user via the network, the method comprising: using the at least one computer to perform acts of: (A) accessing information related to at least the second user; and (B) causing a virtual assistant, executing on a device different from the at least one computer, to interact with the first user at least in part by performing at least one action based on the accessed information.

Some embodiments provide for a system having access to information related to users in a network of users, the network of users comprising a first user and at least a second user associated with the first user via the network, the system comprising: at least one computer configured to perform acts of: (A) accessing information related to at least the second user; and (B) causing a virtual assistant, executing on a device different from the at least one computer, to interact with the first user at least in part by performing at least one action based on the accessed information.

Some embodiments provide for at least one non-transitory computer-readable storage medium storing processor-executable instructions that, when executed by at least one computer having access to information related to users in a network of users, cause the at least one computer to perform a method, the network of users comprising a first user and at least a second user associated with the first user via the network, the method comprising acts of: (A) accessing information related to at least the second user; and (B) causing a virtual assistant, executing on a device different from the at least one computer, to interact with the first user at least in part by performing at least one action based on the accessed information.

Some embodiments provide for a method, performed by a device having access to information related to users in a network of users, the device programmed to implement a virtual assistant, the network of users comprising a first user and at least a second user associated with the first user via the network, the method comprising: (A) accessing information related to at least the second user; and (B) using the virtual assistant to interact with the first user at least in part by performing at least one action based on the accessed information.

Some embodiments provide for a device having access to information related to users in a network of users, the device programmed to implement a virtual assistant, the network of users comprising a first user and at least a second user associated with the first user via the network, the device comprising: at least one processor configured to perform acts of (A) accessing information related to at least the second user; and (B) using the virtual assistant to interact with the first user at least in part by performing at least one action based on the accessed information.

Some embodiments provide for at least one non-transitory computer-readable storage medium storing processor-executable instructions that, when executed by a device having access to information related to users in a network of users, cause the device to perform a method, the device programmed to implement a virtual assistant, the network of users comprising a first user and at least a second user associated with the first user via the network, the method comprising acts of: (A) accessing information related to at least the second user; and (B) using the virtual assistant to interact with the first user at least in part by performing at least one action based on the accessed information.

Some embodiments provide for a method, performed by at least one computer, the method comprising: using the at least one computer to perform acts of: accessing information specifying at least one user-specified condition specified by a user and at least one corresponding user-specified action, the user-specified action to be performed when the user-specified condition is met; determining whether the at least one user-specified condition is met; and when it is determined that the at least one user-specified condition is met, causing a virtual assistant executing on a mobile device different from the at least one computer to perform the at least one user-specified action.

Some embodiments provide for a system comprising: at least one computer configured to perform acts of: accessing information specifying at least one user-specified condition specified by a user and at least one corresponding user-specified action, the user-specified action to be performed when the user-specified condition is met; determining whether the at least one user-specified condition is met; and when it is determined that the at least one user-specified condition is met, causing a virtual assistant executing on a mobile device different from the at least one computer to perform the at least one user-specified action.

Some embodiments provide for at least one non-transitory computer-readable storage medium storing processor-executable instructions that, when executed by at least one computer, cause the at least one computer to perform a method comprising acts of: accessing information specifying at least one user-specified condition specified by a user and at least one corresponding user-specified action, the user-specified action to be performed when the user-specified condition is met; determining whether the at least one user-specified condition is met; and when it is determined that the at least one user-specified condition is met, causing a virtual assistant executing on a mobile device different from the at least one computer to perform the at least one user-specified action.

Some embodiments provide for a method, performed by a mobile device, the method comprising: using the mobile device to implement a virtual assistant that performs acts of: accessing information specifying at least one user-specified condition specified by a user and at least one corresponding user-specified action to be performed when the user-specified condition is met; determining whether the at least one user-specified condition is met; and when it is determined that the at least one user-specified condition is met, performing the at least one user-specified action.

Some embodiments provide for a mobile device configured to implement a virtual assistant that performs acts of: accessing information specifying at least one user-specified condition specified by a user and at least one corresponding user-specified action to be performed when the user-specified condition is met; determining whether the at least one user-specified condition is met; and when it is determined that the at least one user-specified condition is met, performing the at least one user-specified action.

Some embodiments provide for at least one non-transitory computer-readable storage medium storing processor-executable instructions that, when executed by a mobile device configured to implement a virtual assistant, causes the virtual assistant on the mobile device to perform acts of: accessing information specifying at least one user-specified condition specified by a user and at least one corresponding user-specified action to be performed when the user-specified condition is met; determining whether the at least one user-specified condition is met; and when it is determined that the at least one user-specified condition is met, performing the at least one user-specified action.

Some embodiments provide for a method for conducting a call between a caller and an interactive voice response (IVR) system, the caller using a device to conduct the call, the device configured to execute a virtual assistant, the method comprising: using the virtual assistant to conduct the call at least in part by influencing the style of information provided to the caller during the call and/or the content of information passed between the device and the IVR system during the call.

Some embodiments provide for a device for use by a caller to conduct a call between the caller and an interactive voice response (IVR), the device configured to execute a virtual assistant, the device comprising: at least one processor configured to perform an act of: using the virtual assistant to conduct the call at least in part by influencing the style of information provided to the caller during the call and/or the content of information passed between the device and the IVR system during the call.

At least one non-transitory computer-readable storage medium storing processor-executable instructions that, when executed by at least one processor, cause the at least one processor to perform method for conducting a call between a caller and an interactive voice response (IVR), the caller using a device to conduct the call, the device configured to execute a virtual assistant, the method comprising: using the virtual assistant to conduct the call at least in part by influencing the style of information provided to the caller during the call and/or the content of information passed between the device and the IVR system during the call.

The foregoing is a non-limiting summary of the invention, which is defined by the attached claims.

BRIEF DESCRIPTION OF DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

FIG. 12 is a block diagram of an illustrative computer system on which embodiments described herein may be implemented.

DETAILED DESCRIPTION

I. Overview

Figure 1A:
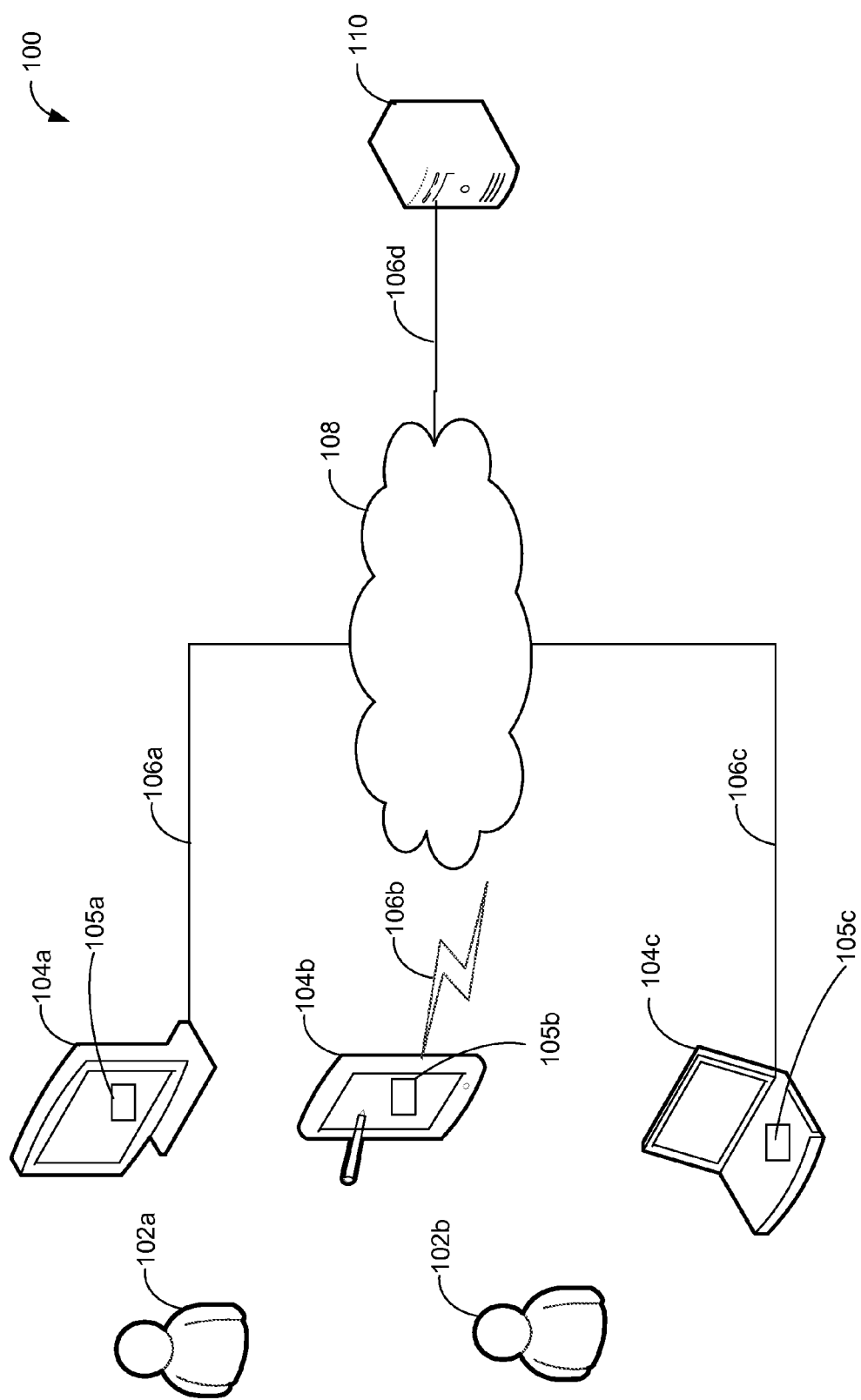
FIG. 1A shows an illustrative environment in which some embodiments of the disclosure provided herein may operate.

The Applicants have appreciated that conventional virtual assistants are limited in the types of information, if any, they have access to about the user with whom the virtual assistant is interacting. The Applicants have appreciated that an improved and increasingly personalized user experience could be provided if a virtual assistant were to have access to additional types of information about the user with whom the virtual assistant is interacting. Thus, some embodiments described herein relate to a virtual assistant that may access a user's profile containing information about the user and customize, based on at least some information in the profile, its behavior when interacting with the user. Accessing information in a user's profile allows the virtual assistant to cater to the user's preferences in any of numerous ways (e.g., by adjusting the style in which the virtual assistant presents information to the user and/or the content of information the virtual assistant presents to the user).

A user may use multiple devices each of which has a conventional virtual assistant implemented thereon. For example, a user may interact with his/her smart phone by using the conventional virtual assistant implemented on the smart phone and may interact with his/her tablet computer by using the conventional virtual assistant implemented on the tablet computer. The Applicants have appreciated that even if a user were to customize the manner in which a conventional virtual assistant implemented on one device (e.g., the user's smart phone) interacts with the user, the conventional virtual assistant implemented on another device (e.g., the user's tablet computer) would need to be customized by the user separately. For example, if a user were to configure the virtual assistant executing on his/her smart phone to provide output in Spanish, the virtual assistant executing on the user's tablet computer would not be aware of how the virtual assistant on the smart phone is configured. The user would need to perform the additional step of changing the settings for the virtual assistant on the tablet computer to configure the virtual assistant implemented thereon to provide output in Spanish as well. Thus, a user interacting with multiple virtual assistants on multiple devices has to customize each of the virtual assistants separately, which is inconvenient, or have inconsistent user experiences when interacting with different conventional virtual assistants implemented on multiple devices.

The Applicants have appreciated that a user's experience may be improved by providing for customization of the manner in which virtual assistants on different devices behave (e.g., interact with the user) such that the virtual assistants behave in a consistent manner and provide the user with an impression that he/she is using the same virtual assistant across multiple devices. Thus, some embodiments described herein relate to allowing virtual assistants executing on different devices to access at least some information in a user's profile and customize their behavior based on at least some information in the profile. Accessing the user's profile allows virtual assistants executing on different devices to customize their behavior so as to provide the user with a consistent experience when interacting with the virtual assistants. As a non-limiting example, virtual assistants executing on different devices may adopt the same style of presenting information to the user (e.g., speaking style, text style, GUI style, etc.) based on information in the user's profile indicating the style in which the user prefers to have information presented to him/her. As another non-limiting example, virtual assistants executing on different devices may present content to the user based on the user's preferences specified in the user's profile.

Some embodiments described herein address all of the above-described issues that the Applicants have recognized with conventional virtual assistants. However, not every embodiment described below addresses every one of these issues, and some embodiments may not address any of them. As such, it should be appreciated that embodiments of the disclosure provided herein are not limited to addressing all or any of the above-described issues of conventional virtual assistants.

Some embodiments are directed to a virtual assistant that may access at least some information in a user's profile and customize, based on the information accessed in the user's profile, its behavior. The user's profile may be stored in any suitable location or locations accessible to the virtual assistant. For example, the user's profile may be stored on the device executing the virtual assistant and/or one or more other devices (e.g., one or more servers, a user's smart phone, etc.) communicatively coupled, directly or indirectly, to the device executing the virtual assistant.

In some embodiments, the virtual assistant may customize its behavior when interacting with the user by customizing the style in which the virtual assistant presents information to the user. The user's profile may include information specifying a virtual assistant persona and the virtual assistant may access this information and customize its behavior by adopting the virtual assistant persona when interacting with the user. As one non-limiting example, information specifying the virtual assistant persona may specify a voice font and/or speaking style and the virtual assistant may adopt the virtual assistant persona by generating speech in accordance with the voice font and/or speaking style. As another non-limiting example, information specifying the virtual assistant persona may specify a GUI style (e.g., a text style) and the virtual assistant may adopt the virtual assistant persona by generating text and/or other graphical information in accordance with the specified text style. These and other examples of how a virtual assistant may customize the style in which it presents information to the user are described in more detail below.

In some embodiments, the virtual assistant may customize its behavior, when interacting with the user, by customizing the content of information the virtual assistant presents to the user. The user's profile may specify information indicative of the user's interests and the virtual assistant may access this information and customize its behavior by tailoring the information it presents to the user to those interests. As one non-limiting example, the user's profile may include information specifying one or more topics of interest to the user (e.g., Russian politics, the New England Patriots football team, cars, etc.) and the virtual assistant may provide (proactively and/or in response to user input) the user with information related to the topic or topics (e.g., news articles, advertisements, etc.). As another non-limiting example, the user's profile may comprise information indicating that the user enjoys media content of a specific type (e.g., a movie genre, a music genre, a musical artist, movies with a particular actor, etc.) and the virtual assistant may recommend (proactively and/or in response to user input) media content of the specific type to the user.

Some embodiments are directed to a system configured to provide multiple virtual assistants executing on different devices with access to at least some common information in a user's profile. In this way, the virtual assistants may customize, based on information in the user's profile, their behavior when interacting with the user so as to provide the user with a consistent experience. For example, the system may receive a request from one device executing a virtual assistant (e.g., the user's smart phone) to access at least some information in the user's profile and provide the device with access to the requested information (if it is determined that the device has permission to have such access) so that the virtual assistant executing on the device is able to customize, based on the accessed information, its behavior when interacting with the user. The system may then receive a request from another device executing a virtual assistant (e.g., the user's laptop) to access the user's profile and the system may provide the other device with access to the profile so that the virtual assistant executing on the other device is able to customize its behavior based on information in the profile. In this way, virtual assistants executing on both devices (e.g., the user's smart phone and laptop) may be able to access at least some common information in the user's profile.

Accordingly, virtual assistants executing on different devices may customize their behavior so as to behave in the same or similar way, based on information in the user's profile, to provide a consistent user experience for the user interacting with these different virtual assistants. Virtual assistants executing on different devices may customize the style and/or content of information they provide to the user to be the same or similar. As a non-limiting example, the user's profile may include information specifying a virtual assistant persona and the virtual assistants executing on different devices may access this information and adopt the same virtual assistant persona when interacting with the user.

In some embodiments, a virtual assistant executing on one device may update the user's profile so that a virtual assistant executing on another device may customize, based on at least some updated information in the user's profile, its behavior when interacting with the user. As one non-limiting example, a virtual assistant executing on one device (e.g., the user's car) may store information in the user's profile indicating that the user is listening to a particular audio book in the car. A virtual assistant executing on another device (e.g., the user's home computer) may access this information in the user's profile and automatically assist the user (e.g., when the user is at home) in continuing to listen to the audio book he/she was listening to in the car (e.g., by prompting the user to ask whether he/she would like to continue listening to the audio book). As may be appreciated from the above example, allowing virtual assistants executing on different devices to access and update (e.g., add, edit, and/or remove) information in the user's profile may allow a user to perform a task (e.g., listening to an audio book) using multiple devices. The user may be performing a task on one device (e.g., listening to music in his car) and may continue performance of that task on a different device (e.g., continue listening to the same music on his home stereo system). Continuing performance of tasks across devices is described in more detail below with reference to FIG. 6.

In some embodiments, the user's profile may be stored remotely from the device on which the virtual assistant is executing (e.g., on one or more devices accessible via a network). As one non-limiting example, the user's profile may be stored on one or more Internet-accessible servers. A virtual assistant executing on a local device (e.g., a user's laptop computer, the user's smart phone, etc.) may access, via the network, information in the remotely stored profile. The local device may store a local copy of the user's profile. The local copy of the user's profile may be synchronized with the remotely stored user's profile at any suitable time and in any suitable manner, as aspects of the disclosure provided herein are not limited in this respect. Such embodiments are described in more detail below with reference to FIG. 1A.

In some embodiments, the user's profile may be stored on a mobile device. As a non-limiting example, the user's profile may be stored on the user's smart phone. A virtual assistant executing on another device (e.g., the user's laptop computer, the user's television, etc.) may access information in the profile stored on the user's mobile device in any suitable way, such as, by establishing a direct wired or wireless connection (e.g., a Bluetooth connection, a near-field RF connection, etc.) with the mobile device. In this way, the user's mobile device operates as a profile hub so that, when the user has the mobile device with him/her, the mobile device allows virtual assistants executing on other devices to access information in the user's profile without having to access any network. Such embodiments are described in more detail below with reference to FIG. 1B.

As described above, a virtual assistant may customize its behavior, based on at least some information in the profile of a user. However, a virtual assistant is not limited to customizing its behavior based only on information in the user's profile. Additionally or alternatively, in some embodiments, a virtual assistant may customize its behavior, based on at least some information in the profile(s) of one or more users other than the user of the device on which the virtual assistant is executing. The other user(s) may be associated with the user of the device via a network of users (e.g., a social network) and/or in any other suitable way.

A virtual assistant operating on the device of a particular user ("Alice" for ease of reference) may customize its behavior based on information in the profile(s) of one or more other users in any of numerous ways. As one non-limiting example, a virtual assistant interacting with Alice may access information at least partially specifying the schedule(s) of at least one other user and schedule an event (e.g., a meeting, a phone call, etc.) between Alice and the at least one other user based on the accessed information. As another non-limiting example, information in the profile(s) of one or more other users may comprise information identifying one or more topics of interest to the other user(s) and the virtual assistant may customize its behavior by presenting information (e.g., news articles, advertisements, etc.) related to the identified topic(s) to Alice. For instance, one or more users associated with Alice via a network may have information in their profiles indicating that they are interested in news about politics in Egypt. Accordingly, the virtual assistant interacting with Alice may provide (proactively or in response to input from Alice) Alice with a link to a news article about Egyptian politics. As another non-limiting example, one or more users associated with Alice via a network may have information in their profiles indicating that they like a particular item or items (e.g., media content, a product, etc.) and the virtual assistant may provide (proactively or in response to input from Alice) Alice with a recommendation of the particular item(s) (e.g., by presenting an advertisement for the media content, product, etc.). For instance, a user may wish to see a movie with his friend Joe and may ask the virtual assistant for a recommendation of a movie that he and Joe would both enjoy. In response, the virtual assistant may provide a recommendation of a movie based on information in Joe's profile and the user's profile indicating the types of movies that Joe and the user enjoy.

As may be appreciated from the above discussion, in some embodiments, a virtual assistant may proactively perform one or more actions when interacting with a user (e.g., provide information to the user) based on at least some information in the user's profile and/or on at least some information in the profile(s) of one or more other users associated with the user. Additionally or alternatively, a virtual assistant may perform one or more user-specified actions when one or more user-specified conditions are met.

In some embodiments, a user may specify at least one condition and at least one corresponding action to be performed by the user's virtual assistant when the at least one user-specified condition is met. When a determination is made that the user-specified condition is met (e.g., by the virtual assistant or another computer configured to communicate with the device executing the virtual assistant), the virtual assistant may perform the user-specified action. As one non-limiting example, the virtual assistant may alert the user (e.g., by changing the background color on the desktop of the device it is running on) when it is determined that the user of the device is running late for a meeting. As another non-limiting example, the virtual assistant may present the user with an update on the score of a sports game (e.g., a basketball game), when it is determined that the score changed by a threshold amount (e.g., by ten points). Other examples of user-specified conditions and corresponding user-specified actions are provided below.

In some embodiments, the virtual assistant may perform a user-specified action (e.g., send an e-mail including a link to the weather forecast to my spouse, ring an alarm, etc.) at least in part by using another application program (e.g., an e-mail application program, an alarm application program, etc.) when a corresponding user-specified condition has been met (e.g., when the weather forecast includes rain, when the price of a particular stock falls below a threshold, etc.). In other embodiments, a virtual assistant need not use one or more other application programs to perform the action, as some user-specified actions (e.g., provide information to the user by generating speech) may be performed by the virtual assistant on its own.

The Applicants have also appreciated that when a caller uses a device (e.g., a smart phone) in a call with an interactive voice response (IVR) system, using a virtual assistant executing on the device to conduct the call may provide for an improved interaction between the caller and the IVR system. Accordingly, some embodiments provide for using a virtual assistant executing on the caller's device to conduct a call between an IVR system and the caller. The virtual assistant may access at least some information in the caller's profile and conduct the call by influencing, based on the accessed information, the style in which information is provided to the caller during the call and/or the content of information passed between the IVR and the device used by the caller to conduct the call.

In some embodiments, the caller's profile may include information specifying a virtual assistant persona and the virtual assistant may influence the style in which information is provided to the caller during the call by adopting the virtual assistant persona when providing information received from the IVR to the caller. For example, the virtual assistant persona may specify a voice font and/or speaking style and the virtual assistant may generate speech in accordance with the voice font and/or speaking style to communicate information received from the IVR to the caller. In this way, information from the IVR is presented to the caller in the familiar and personalized style of the caller's virtual assistant, rather than the style of speech provided directly by conventional IVR systems.

In some embodiments, the virtual assistant conducts the call by providing at least some information desired by the IVR system from the caller's profile, without asking the user to enter this information. As one non-limiting example, a caller's profile may include information identifying the caller (e.g., name, address, social security number, etc.) and the virtual assistant may provide at least some information identifying the caller to the IVR system so that the caller need not enter this information. As another non-limiting example, the caller's profile may include information (e.g., an account number, a credit card number, etc.) provided by the caller to the IVR system in one or more prior calls between the caller and the IVR system, and the virtual assistant may provide at least some such information previously provided by the caller to the IVR system without requiring the caller to enter it.

It should be appreciated that the embodiments described herein may be implemented in any of numerous ways. Examples of specific implementations are provided below for illustrative purposes only. It should be appreciated that these embodiments and the features/capabilities provided may be used individually, all together, or in any combination of two or more, as aspects of the disclosure provide herein are not limited in this respect.

II. Ubiquitous Virtual Assistant

Figure 1B:
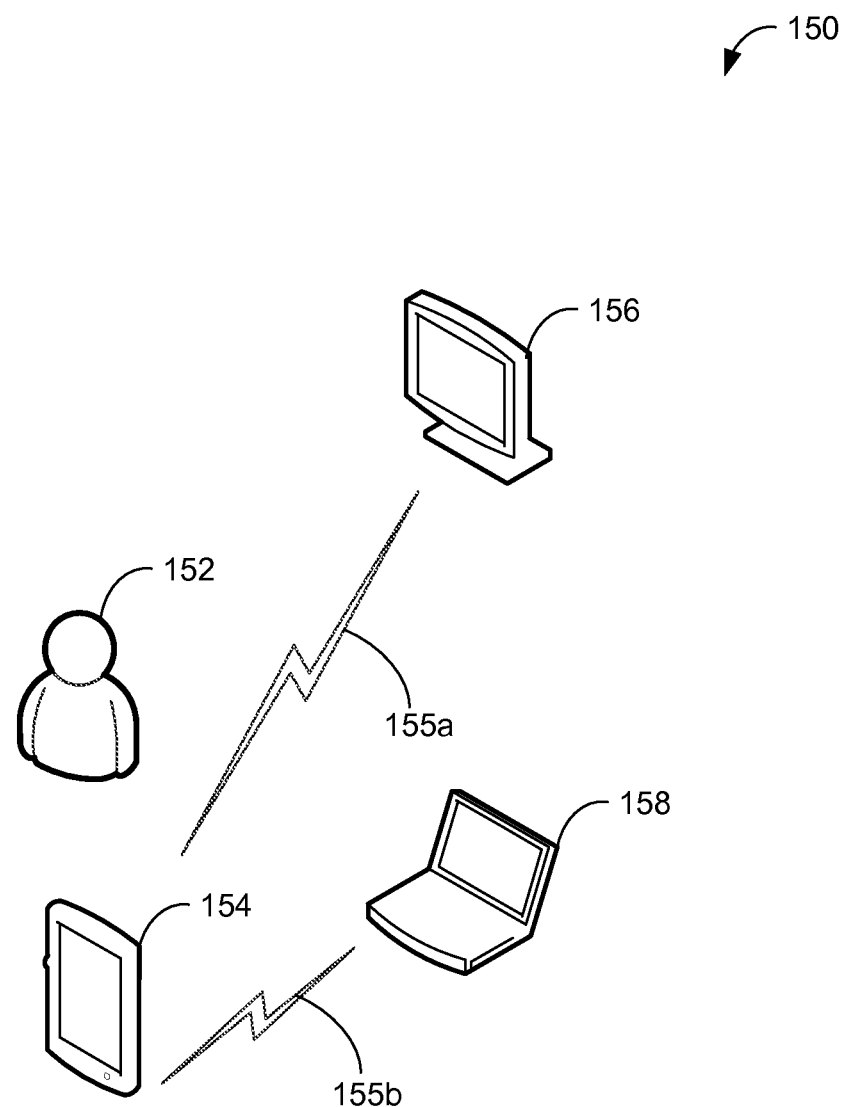
FIG. 1B shows another illustrative environment in which some embodiments of the disclosure provided herein may operate.

Some embodiments of the disclosure provided herein may operate in an environment such as the illustrative environment 100 shown in FIG. 1A. In the illustrative environment 100, user 102a may interact with computing device 104a to access information via the computing device, to provide input to the computing device, to obtain output from the computing device, use one or more application programs on the computing device, to perform one or more actions using the operating system on the computing device, and/or for any other suitable purpose. Similarly, in the illustrative environment 100, user 102a may interact with computing device 104b and user 102b may interact with computing devices 104b and 104c for any of the above-described purposes or any other suitable purpose.

Computing devices 104a, 104b, and 104c are programmed to implement virtual assistants 105a, 105b, and 105c respectively. User 102a may interact with computing device 104a at least in part by using virtual assistant 105a. Users 102a and 102b may interact with computing device 104b at least in part by using virtual assistant 105b. User 102b may interact with computing device 104c at least in part by using virtual assistant 105c. In the illustrated embodiment, each of computing devices 104a, 104b, and 104c, is programmed to implement one virtual assistant. However, aspects of the disclosure provided herein are not limited in this respect, as each computing device may be programmed to implement multiple virtual assistants.

As previously described, a virtual assistant may access information in a user's profile and customize its behavior based on at least some information in the user's profile. (Examples of how a virtual assistant may customize its behavior, based on information in a user's profile are provided herein.) For example, virtual assistant 105a may be configured to access of a profile user 102a and customize, based at least on some information in the profile of user 102a, its behavior when interacting with user 102a. As another example, virtual assistant 105b may be configured to access a profile of user 102a and customize, based on at least some information in the profile of user 102a, its behavior when interacting with user 102a. As yet another example, virtual assistant 105b may be configured to access a profile of user 102b and customize, based on at least some information in the profile of user 102b, its behavior when interacting with user 102b. As yet another example, virtual assistant 105c may be configured to access a profile of user 102b and customize, based on at least some information in the profile of user 102b, its behavior when interacting with user 102b.

In the illustrated environment, virtual assistants 105a and 105b may customize their behavior to behave in the same or similar way, based on information in the profile of user 102a, so as to provide a consistent user experience for user 102a when he/she interacts with these virtual assistants. Similarly, virtual assistants 105b and 105c may customize their behavior to behave in the same or similar way, based on information in the profile of user 102b, so as to provide a consistent user experience for user 102b when he/she interacts with these virtual assistants.

As may be appreciated from the above examples, a virtual assistant executing on a single device (e.g., virtual assistant 105b executing on device 104b) may customize its behavior in different ways when interacting with different users (e.g., users 102a and 102b) based on information accessed in their respective profiles. As a non-limiting example, virtual assistant 105b may adopt one virtual assistant persona (e.g., specified in the profile of user 102a to cause the virtual assistant to talk with a slow speaking rate using a female voice having a British accent) when interacting with user 102a and another virtual assistant persona (e.g., specified in the profile of user 102b to cause the virtual assistant to talk with a male voice in a verbose manner) when interacting with user 102b. As a specific non-limiting example, computing device 104b may be a home television and the virtual assistant executing thereon may provide each family member with a personalized experience when interacting with him or her. As another specific non-limiting example, computing device 104b may be a computing device in a car (e.g., a navigation unit) and the virtual assistant executing thereon may provide each family member with a personalized experience when interacting with him or her.

In some embodiments, when a virtual assistant is configured to interact with multiple users, the virtual assistant may determine which particular user the virtual assistant is interacting with so that the virtual assistant may customize its behavior to the particular user (e.g., based on information in the particular user's profile). A virtual assistant may determine which user it is interacting with in any of numerous ways. In some embodiments, the virtual assistant may determine that it is interacting with a particular user, when the virtual assistant is invoked with a particular utterance (e.g., a keyword, a phrase, a name, etc.) associated with the particular user. For example, different members of a family may invoke a virtual assistant in a car using different names (e.g., the Dad may invoke the virtual assistant by saying "Hi Pepper" and the virtual assistant may determine that it is interacting with the Dad because the Dad calls his virtual assistant "Pepper," the Mom may invoke the virtual assistant by saying "Hi Bettie" and the virtual assistant may determine that it is interacting with the Mom because Mom calls her virtual assistant "Bettie," etc.). In some embodiments, the virtual assistant may determine that it is interacting with a particular user by identifying the user based on the user's voice (e.g., by using the user's voice signature). It should be appreciated that a virtual assistant may determine which user it is interacting with in any other suitable way (e.g., using a combination of the above-described techniques), as aspects of the disclosure provided herein are not limited in this respect.

In some embodiments, when a virtual assistant is configured to interact with multiple users, the virtual assistant may interact with multiple users in parallel. For example, the virtual assistant may interact with one user, while the dialogue for another user is active. A virtual assistant may perform a task for one user in parallel with performing another task for another user and may interact with each user in a manner customized to that user. As one non-limiting example, when Mom and Dad are in a car, the Dad may ask the virtual assistant to navigate the car to a particular destination (e.g., "Hi Pepper, please navigate to the Four Seasons"). While they are driving and the virtual assistant is providing directions in a manner customized to the Dad (e.g., by providing output based on information in the Dad's profile), the Mom may ask the virtual assistant to look up the weather (e.g., "George, what is the forecast for tomorrow") and the virtual assistant provides this information in a manner customized to the Mom (e.g., by providing output based on information in the Mom's profile).

A virtual assistant may be configured to access a user's profile locally on the device on which the virtual assistant is executing and/or remotely from one or more other devices. As a non-limiting example, virtual assistant 105a may be configured to access the profile of user 102a locally on computing device 104a and/or remotely from server 110 (described in more detail below). When copies of a user's profile are stored both locally on a device configured to implement a virtual assistant and remotely on one or more other devices, the copies may be synchronized in any suitable way (e.g., by the virtual assistant and/or other software).

A virtual assistant may interact with a user in any suitable way. In some embodiments, a virtual assistant may interact with a user by receiving any type of input provided by the user to the device executing the virtual assistant, processing the provided input, performing one or more actions based on the provided input, presenting the user with one or more outputs in response to the provided input, and/or performing any other suitable function(s). In some embodiments, a virtual assistant may interact with a user by performing one or more actions proactively, without user input. For example, the virtual assistant may provide one or more outputs to the user (e.g., prompts for information, notifications, etc.), perform one or more actions (e.g., send/receive information from/to one or more application programs and/or operating system executing on the device executing the virtual assistant, invoke one or more functions of one or more application programs and/or operating system executing on the device executing the virtual assistant, etc.), and/or proactively perform any other suitable function(s). As one non-limiting example, a virtual assistant may interact with a user by updating information in the user's calendar (e.g., to automatically schedule a work meeting based on an invite from the user's boss) either proactively or based on user input.

In some embodiments, a virtual assistant may receive voice input from a user. The voice input may be any suitable input that a user may provide by voice. In some embodiments, the voice input may comprise one or more utterances from a pre-defined set of utterances (i.e., a fixed grammar) that the virtual assistant is configured to process. However, in other embodiments, a user is not limited to providing voice input to a virtual assistant by speaking one or more utterances from a fixed grammar and, for example, may provide voice input by speaking naturally by providing free-form voice input. As such, in some embodiments, voice input may comprise natural language input and a virtual assistant may be configured to process the natural language input using any suitable speech recognition and/or natural language understanding techniques. The speech recognition and natural language understanding techniques may be fully performed by the computing device executing the virtual assistant (e.g., computing device 104a), fully performed by one or more other computing devices to which the computing device executing the virtual assistant has access (e.g., one or more web servers), or may be performed at least in part by the computing device executing the virtual assistant and at least in part by one or more other computing devices (e.g., one or more web servers) to which the computing device executing the virtual assistant has access.

In some embodiments described below, a virtual assistant is not limited to receiving voice input from a user and may also receive any of the other types of inputs that may be provided to the computing device executing the virtual assistant. However, not all embodiments are limited in this respect, and aspects of the disclosure provided herein may be employed with virtual assistants limited to receiving voice input.

In some embodiments, a virtual assistant includes (or communicates with) an automatic speech recognition (ASR) engine that recognizes the user's speech and a natural language understanding (NLU) engine that analyzes the recognized speech to determine an action intended by the user. These components can be implemented separately or integrated in any suitable way (many examples of which are known), as aspects of the disclosure provided herein are not limited to any type of ASR engine or any type of NLU engine. These and other components of a virtual assistant are described in more detail below with reference to FIG. 3A.

A virtual assistant may provide any suitable type of output to a user. In some embodiments, a virtual assistant may provide a user visual output using one or more displays, acoustic output using one or more speakers, tactile output (e.g., by causing the computing device on which the virtual assistant is executing to vibrate), and/or any other suitable output.

In the illustrated embodiment, computing device 104a is a desktop computer, computing device 104b is a tablet computer, and computing device 104c is a laptop computer. However, aspects of the disclosure provided herein are not limited in this respect, as each virtual assistant in accordance with the embodiments described herein may be implemented on any electronic device with which a user may interact at least in part by using a virtual assistant. For example, in some embodiments, any of computing devices 104a-c may be a portable device such as a mobile smart phone, a personal digital assistant (PDA), a laptop computer, a tablet computer, or any other portable device with which a user may interact at least in part by using a virtual assistant. Alternatively, any of computing devices 104a-c may be a fixed electronic device such as a desktop computer, a server, a rack-mounted computer, or any other suitable fixed electronic device with which a user may interact at least in part by using a virtual assistant. It should be appreciated that while, in some embodiments, a virtual assistant may be implemented using a computing device with which a user interacts (e.g., computing devices 104a-c), in other embodiments, a virtual assistant may be implemented using one or more servers (e.g., server 110), or at least in part by using a computing device with which the user interacts and at least in part by using one or more servers, as aspects of the disclosure provided herein are not limited in this respect.

In some embodiments, a user may interact with a virtual assistant executing on computing device belonging to the user (e.g., the user's laptop computer, the user's smart phone, a computer in the user's car, etc.). However, a user is not limited to interacting with a virtual assistant executing only on devices belonging to the user and, in some embodiments, may interact with a virtual assistant on any other suitable device (e.g., a computer in a car the user rented, an entertainment system in a hotel room in which the user is staying, a public computer in an Internet-cafe, etc.). Regardless of whether or not a computing device belongs to a user, the computing device may implement a virtual assistant configured to request access to information in a user's profile and, if granted permission to access the requested information, customize its behavior based on the accessed information.

Each of computing devices 104a, 104b, and 104c is configured to communicate with server 110 via communication links 106a-106d and network 108. Network 108 may be any suitable type of network such as a local area network, a wide area network, the Internet, an intranet, or any other suitable network. Each of communication links 106a-106d may be a wired communication link, a wireless communication link, or any other suitable type of communication link. Computing devices 104a-104c and server 110 may communicate through any suitable networking protocol (e.g., TCP/IP), as the manner in which information is transferred between server 110 and computing devices 104a-104c is not a limitation of aspects of the disclosure provided herein.

Server 110 may store a user profile for each of one or more users. In the illustrated embodiment, server 110 stores a first user profile for user 102a and a second user profile for user 102b. Server 110 may store user profiles for any suitable number of users. Server 110 may store a user profile in any suitable way and in any suitable format, as aspects of the disclosure provided herein are not limited in this respect. Server 110 may be one or multiple computers. For embodiments in which the server 110 comprises multiple computers, the computers need not be located in the same physical location and may be distributed across multiple physical locations. In some embodiments, server 110 may be part of a cloud-computing environment.

Server 110 may be configured to receive requests from one or multiple computing devices (e.g., computing devices 104a, 104b, or 104c) to access information in the profiles of one or more users (e.g., users 102a and 102b). Server 110 may determine whether a computing device requesting access to a user's profile has permission to access at least some information in the user's profile and, when server 110 determines that the computing device has permission to access at least some information in the user's profile, server 110 may provide the computing device with access to the information. Server 110 may provide a computing device requesting access to information in a user's profile with access to all, some, or none of the information in the user's profile.

It should be appreciated that environment 100 is only illustrative and that many variations are possible. For example, although environment 100 illustrates two users, each interacting with two computing devices, this is merely for simplicity of presentation, as illustrative environment 100 may comprise any suitable number of users (e.g., at least 100, at least 1000, at least 10,000, etc.), each user interacting with any suitable number of computing devices using respective virtual assistants implemented thereon.

In some embodiments, such as those that may operate in the illustrative environment 100 of FIG. 1A, a user's profile may be stored remotely on one or more network-accessible servers and a virtual assistant executing on a computing device with which the user is interacting (e.g., the user's laptop computer, a computer at an Internet cafe the user is using, etc.) may access, via the network, information in the remotely-stored profile of the user. However, in other embodiments described below with reference to FIG. 1B, a user's profile may be stored on a portable device belonging to the user (e.g., the user's smart phone) and a virtual assistant executing on any other computing device (e.g., the user's laptop computer, a computer at an Internet cafe, a computer in an automobile, etc.) may access information in the profile stored on the user's portable device by establishing a direct connection with the portable device. In some embodiments, a user's profile may be stored as encrypted data to provide data security. The user's profile may be encrypted in any suitable way, as aspects of the disclosure provided herein are not limited in this respect.

In the illustrative environment 150 (FIG. 1B), user 152 carries portable device 154 having the user's profile stored thereon. Portable device 154 may store the user's profile in any suitable way and in any suitable format, as aspects of the disclosure provided herein are not limited in this respect.

Portable device 154 may be configured to provide one or more other computing devices with access to the user profile stored in portable device 154. In the illustrated embodiment, portable device 154 is configured to provide computing devices 156 and 158 with access to the profile of user 152 so that virtual assistants executing thereon may customize their behavior, based on at least some information in the profile, when interacting with user 152.

Portable device 154 may be configured to provide another computing device with access to the user profile via a direct communication link between the portable device and the other computing device. The direct communication link may be a wired or a wireless communication link such as a Bluetooth link, a near-field radio frequency link, a near-field infrared link, or any other suitable type of wireless communication link. In the illustrated embodiment, portable device 154 is configured to provide computing devices 156 and 158 with access to the profile of user 152 via direct wireless links 155a and 155b, respectively. Though, it should be appreciated that in other embodiments the communication link between the portable device and the other computing device may be a wired link and/or an indirect link established using one or more other computing devices (e.g., one or more relays, one or more routers, one or more pieces of network equipment, etc.).

Portable device 154 may be the user's smart phone, the user's PDA, the user's tablet computer, the user's laptop, and/or any other type of portable device capable of providing one or more other devices with access to the profile of user 152. For example, the portable device 154 may be any device that can store the user's profile and is capable of communication with one or more other computing devices.

In some embodiments, portable device 154 may be configured to implement a virtual assistant. The virtual assistant may be configured to access the profile of user 152 and customize, based on at least some information in the profile, its behavior when interacting with user 152.

Each of computing devices 156 and 158 may be any type of computing device configured to implement a virtual assistant. As a non-limiting example, in the illustrative environment 150, computing device 156 is a television and computing device 158 is a laptop computer. A virtual assistant implemented on computing device 156 (or computing device 158) may be configured to access a profile of user 152 and customize its behavior based on at least some information in the profile.

As previously described with reference to FIG. 1A, a virtual assistant may be configured to access a user's profile locally on the device on which the virtual assistant is executing and/or remotely from one or more other devices. For example, in the illustrative environment 150, a virtual assistant executing on computing device 156 (or 158) may be configured to access the profile of user 152 locally on computing device 156 (or 158) and/or remotely from portable device 154. When copies of a user's profile are stored both locally on a device configured to implement a virtual assistant (e.g., computing device 156) and remotely on one or more other devices (e.g., portable device 154), the copies may be synchronized. The synchronization may be performed in any suitable way, as aspects of the disclosure provided herein are not limited in this respect.

A user's profile may comprise any suitable information that may be used by a virtual assistant to customize its behavior. Non-limiting examples of information that may be stored in a user's profile are provided below with reference to FIG. 2, which is a block diagram of information stored in an illustrative user profile 200, in accordance with some embodiments of the disclosure provided herein.

Illustrative user profile 200 stores identification information 202, personal information 204, virtual assistant persona information 206, application and services information 208, device information 209, dialogue history information 210, and user preferences 212. Non-limiting examples of each of the above-listed types of information are provided below, though a user profile may, additionally or alternatively, store any other suitable type of information.

User profile 200 is a profile of a particular user and, in some embodiments, identification information 202 may comprise any suitable information identifying the particular user. Non-limiting examples of identification information include the user's login and password for accessing the user profile, the user's name, the user's address, answers to one or more security questions, the user's social security number, an identifier of each of one or more of the user's devices (e.g., an identifier of the user's smart phone, laptop, etc.), a digital representation of the user's fingerprint(s), or biometric information such as information that may be used to identify the user based on the user's voice (e.g., the user's voice signature), and/or any other suitable information that may be used to identify the user.

In some embodiments, identification information 202 may comprise information specifying one or more devices that may access the user's profile. For example, identification information 202 may specify a specific list of devices (e.g., identifying each device by a device identifier or in any other suitable manner) that may access the user's profile. As another example, identification information may specify certain types of devices (e.g., mobile devices, devices located in a certain geographic area or areas, devices belonging to or operated by a particular entity, etc.) that may access the user's profile. As yet another example, identification information 202 may specify one or more devices that may not have access to the user's profile. In some embodiments, identification information 202 may further specify which portions of the user's profile (e.g., virtual assistant persona information, personal information, all information, etc.) each device may access.

In some embodiments, identification information 202 may comprise information specifying one or more other users, different from the user whose information is contained in user profile 200, that may access the user's profile. Identification information 202 may further specify which portions of the user's profile (e.g., user's interests, all information, etc.) other users may access and may do so globally for all other users, for groups of users, or individually per other user.

Personal information 204 may comprise any suitable personal information about the user. Non-limiting examples of personal information include the user's mailing address(es), the user's phone number(s), the user's e-mail address(es), numbers of one or more of the user's accounts (e.g., bank accounts, credit card accounts, etc.), login information to one or more online services used by the user (e.g., the user's Twitter® login information, the user's Facebook® login information, the user's LinkedIn® login information, etc.), information identifying one or more of the user's contacts (e.g., their names, their addresses, their telephone numbers, their e-mail addresses, their online identifiers in one or more social networks, etc.), and/or any other suitable personal information.

Virtual assistant persona information 206 may comprise information specifying one or multiple personas that a virtual assistant may adopt when interacting with the user. For example, the virtual assistant persona information may specify a virtual assistant persona that a virtual assistant may adopt when interacting with the user while the user is at work and another virtual assistant persona that a virtual assistant may adopt when interacting with the user while the user is at home. As another example, the virtual assistant persona information may specify a virtual assistant persona that a virtual assistant may adopt for each of one or more types of tasks (e.g., business-related tasks, leisure-related tasks, family-related tasks, etc.) that the user may perform when interacting with the virtual assistant.

Information specifying a virtual assistant persona may specify how a virtual assistant is to "talk" and/or "behave" upon adopting the virtual assistant persona. As one non-limiting example, information specifying a virtual assistant persona may specify a voice font according to which a virtual assistant may generate speech upon adopting the virtual assistant persona. A voice font may specify whether the voice is a male voice or a female voice, the pitch of the voice, the accent of the voice, the speed of the voice, etc. As another non-limiting example, information specifying a virtual assistant persona may specify a speaking style (e.g., whether the speech is verbose or terse, whether the speech is causal or formal, whether the speech is humorous, whether the speech is sarcastic, whether the speech is to use simple or sophisticated vocabulary, etc.) according to which a virtual assistant may generate speech upon adopting the virtual assistant persona.

Information specifying a virtual assistant persona may specify a text style according to which a virtual assistant may generate text upon adopting the virtual assistant persona. A text style may correspond to any of the above-described speaking-styles (e.g., a virtual assistant may generate verbose or terse text, casual or formal text, humorous text, sarcastic text, text using simple or sophisticated vocabulary, etc.) or any other suitable text style, as aspects of the disclosure provided herein are not limited in this respect.

Information specifying a virtual assistant persona may specify one or more graphical user interface (GUI) elements that a virtual assistant, upon adopting the virtual assistant persona, may present to the user. For example, information specifying the virtual assistant persona may indicate that the virtual assistant is to show one or more images (e.g., a particular picture representing the virtual assistant such as the assistant's avatar form, a background image pleasing to the user, etc.) to the user when interacting with the user. As another example, the information specifying the virtual assistant persona may indicate that the virtual assistant is to show (or alternatively hide) a text transcription of any spoken output provided to the user.

Information specifying a virtual assistant persona may specify one or more wake-up phrases and/or names to which a virtual assistant, having adopted the persona, will respond. For example, information specifying a virtual assistant persona may specify a name for the virtual assistant (e.g., Alice, Bob, Sam, Johnny, etc.) and the virtual assistant will begin to interact with the user in response to the user uttering the virtual assistant's name. As another example, information specifying a virtual assistant persona may specify a wake-up phrase (e.g., "wake-up," "can you help me?" etc.) to which the virtual assistant will respond.

Application and services information 208 may comprise information about the user's interactions with one or more application programs on any suitable device(s) and/or one or more services accessed via any suitable device(s). In some embodiments, application and services information 208 may comprise information related to one or more tasks being performed by one or more devices with which the user is interacting. As one non-limiting example, application and services information 208 may indicate that the user is listening to a song using an application program configured to play music on the user's smart phone and, optionally, how much of the song the user listened to (e.g., so that if the user stops listening to song, the user may resume listening to the song). As another non-limiting example, application and services information 208 may indicate that the user is listening to an audio book in the user's car and, optionally, how much of the audio book the user listened to (e.g., so that if the user stops listening to audio book, the user may resume listening to the audio book). As yet another non-limiting example, application and services information 208 may indicate that the user is watching a sports game on his home television.

Application and services information 208 may comprise information indicating which application programs and/or services the user has used, what inputs the user provided to the application programs and/or services, what information the application and/or services provided to the user, when the user used particular application programs and/or services, where the user was located when the user used particular application programs and/or services, and/or any other suitable information.

Application and services information 208 may comprise information associated with each of one or more applications and/or services. The information associated with an application and/or service may be written to the user's profile by or on behalf of the application and/or service. The information associated with an application and/or service may be stored in a portion of the profile associated with (e.g., registered, dedicated, etc.) to the application and/or service. In this way, an application and/or service (e.g., an application of a hotel) may add information to the user's profile (e.g., indicating that the user prefers a non-smoking room and business-class rooms). The application and/or service may specify whether information associated with the application and/or service may be accessed by other applications and/or services.

Device information 209 may comprise information stored for each of one or more devices that may be configured access the user's profile. Information stored for a device may include information used by a virtual assistant executing on the device (e.g., when interacting with the user). As one non-limiting example, information stored for a device may include a user's voice signature that may be used to authenticate the user. Information for different devices may include different voice signatures because the devices may be used in different acoustic environments (e.g., a television may be used inside a home, a navigation unit may be used inside a car, a mobile phone may be used outside, etc.) As another non-limiting example, information stored for a device may include one or more device settings (e.g., one or more user interface settings, one or more networking settings, one or more security settings, one or more power management settings, etc.). A virtual assistant executing on a device may change the settings of the device based on settings for the device stored in the user's profile. As yet another non-limiting example, information stored for a device may include identification information for the device (e.g. hardware identifier, unique identifier provided by virtual assistant software, etc.). Different types of information may be stored different devices.

Dialog history information 210 comprises transcripts of one or more interactions between the user and one or more virtual assistants executing on one or more devices. For example, the user profile for user 102*a* may comprise transcripts of any interactions between user 102*a* and virtual assistant 105*a* as well transcripts of any interactions between user 102*a* and virtual assistant 105*b*. A transcript of an interaction between the user and a virtual assistant may comprise text corresponding to at least some of the input provided by the user to the virtual assistant and text corresponding to at least some of the output provided by the virtual assistant to the user.

Interests information 212 may comprise any suitable information indicative of what the user's interests are. As one non-limiting example, interests information may indicate one or more web sites of interest to the user. As another non-limiting example, interests information 212 may indicate one or more topics of interest to the user (e.g., Russian politics, the New England Patriots football team, cars, etc.). As yet another non-limiting example, interests information 212 may indicate one or more products in which the user may be interested. As yet another non-limiting example, interests information 212 may indicate that the user enjoys media content of a specific type (e.g., a movie genre, a music genre, a musical artist, movies with a particular actor, etc.).

Figure 3A:
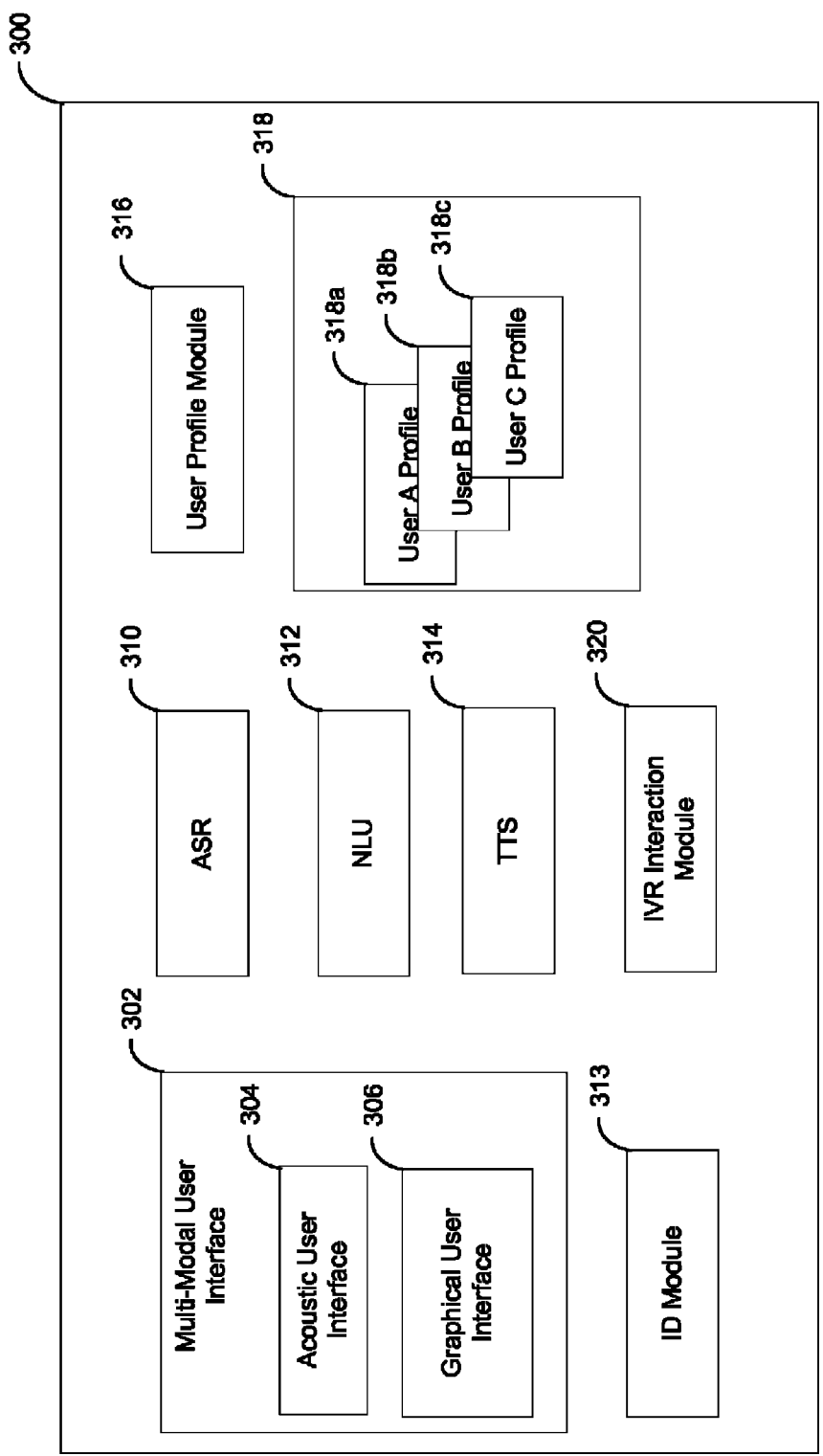
FIG. 3A is a block diagram of software components of an illustrative virtual assistant, in accordance with some embodiments of the disclosure provided herein.

Embodiments of a virtual assistant as described herein may be implemented in hardware, software, or as a combination of hardware and software (e.g., as processor-executable instructions stored on at least one non-transitory computer readable medium that, when executed by one or more processors, perform the functionality of a virtual assistant). One embodiment of a virtual assistant that is implemented, at least in part, by using software is illustrated in FIG. 3A, which shows a block diagram of software components of an illustrative virtual assistant 300. It should be recognized that the software components shown in FIG. 3A are merely illustrative and that a virtual assistant may be implemented by using other software components in addition to or instead of the software components shown in FIG. 3A.

Any suitable computing device (e.g., computing devices 104*a*, 104*b*, 104*c*, 154, 156, and 158), or a collection of two or more computing devices, may be programmed to implement virtual assistant 300, as aspects of the disclosure provided herein are not limited in this respect. For example, in some embodiments virtual assistant 300 may be implemented using a computing device with which the user interacts (e.g., a mobile computing device). In some embodiments, virtual assistant 300 may be implemented using one or more servers (e.g., server 110). In some embodiments, virtual assistant 300 may be implemented at least in part by using a device with which the user interacts and at least in part by using one or more servers.

Illustrative virtual assistant 300 comprises a multi-modal user interface (UI) component 302 for supporting interaction between a user and the virtual assistant in two or more modes. In the illustrative embodiment shown in FIG. 3A, multi-modal UI component 302 comprises acoustic UI component 304 and graphical UI component 306.

As previously mentioned, a virtual assistant may be configured to receive voice input from a user and present a user with acoustic output. Such functionality may be performed at least in part by acoustic UI component 304. To interact with a user by using speech, acoustic UI component 304 may use any suitable technology such as automatic speech recognition (ASR) and/or text-to-speech synthesis (TTS) technology. In the illustrated embodiment, such functionality may be provided by ASR engine 310 and TTS engine 314, respectively. Furthermore, as discussed above, in some embodiments the user's speech is unconstrained and the user may speak naturally. In such embodiments, the virtual assistant may further include (or have access to) a natural language understanding (NLU) component 312.

ASR engine 310 may be configured to process any voice input provided to the virtual assistant 300 by a user and produce a textual representation of the voice input, and comprises one or more computer programs that, when executed by at least one computing device (e.g., computing device 104*a* or any other suitable computing device(s) or processor(s)), are configured to do so. For example, ASR engine 310 may be configured to perform speech recognition on input acoustic waveforms provided to the virtual assistant 300 using one or more acoustic models, language models, dictionaries, vocabularies, grammars and/or any combination of these or other suitable ASR techniques, as aspects of the disclosure provided herein are not limited by the specific implementation of the ASR engine.

NLU component 312 may be configured to interpret any voice input provided to the virtual assistant 300 by a user, and comprises one or more computer programs that, when executed by at least one computing device (e.g., computing device 304 or any other suitable computing device(s) or processor(s)), are configured to do so. As such, the NLU component 312 may be used to understand the meaning of voice input provided to the virtual assistant. NLU component 312 may be configured to interpret voice input in any suitable way and using any suitable natural language understanding technique or techniques, as aspects of the disclosure provided herein are not limited in any way by the specific implementation of the NLU component.

In some embodiments, NLU component 312 may be configured to interpret voice input at least in part by analyzing its corresponding textual representation, which may be produced by ASR engine 310. As such, although in the illustrated embodiment NLU component 312 is separate from ASR engine 310, in other embodiments, ASR engine 310 and NLU component 312 may be part of the same component, as aspects of the disclosure provided herein are not limited in this respect.

It should be appreciated that NLU component 312 is not limited to interpreting voice input and may be used to interpret any of numerous other types of input that may be provided to virtual assistant 300. For example, NLU component may be used to interpret text input provided to virtual assistant by typing, writing, and/or in any other suitable way.

TTS engine 314 may be configured to convert a textual representation of content into synthesized speech, and comprises one or more computer programs that, when executed by at least one computing device (e.g., computing device 104*a* or any other suitable computing device(s) or processor(s)), are configured to do so. TTS engine 314 may use concatenative synthesis, formant synthesis, model-based synthesis, articulatory synthesis, HMM-based synthesis, sinewave synthesis, or any other approach to speech synthesis, as aspects of the disclosure provided herein are not limited by the specific implementation of the TTS engine. For example, in some embodiments, TTS engine 314 may be configured to present recorded acoustic waveforms to the user.

In some embodiments, TTS engine 314 may be configured to generate speech in accordance with a virtual assistant persona adopted by virtual assistant 300. For example, if virtual assistant 300 adopts a virtual assistant persona having a particular voice font and/or speaking style, TTS engine 314 may generate speech in accordance with the particular voice font and/or speaking style.

Although shown as part of the virtual assistant 300 in FIG. 3A, it should be appreciated that each of ASR engine 310, NLU component 312, and TTS engine 314 may be implemented separately from virtual assistant 300 and communicate with virtual assistant 300. Accordingly, functionality performed by ASR engine 310, NLU component 312, and TTS engine 314 may be fully performed locally by a computing device programmed to implement virtual assistant 300 (e.g., computing device 104a), fully performed remotely by one or more other computing devices to which the computing device programmed to implement virtual assistant 300 has access (e.g., one or more web servers accessible via a network such as an Intranet or the Internet such as server 110), or performed at least in part locally and at least in part remotely. In some embodiments, functionality performed by ASR engine 310, NLU component 312, and TTS engine 314 may be performed at least in part remotely when the computing device (e.g., a mobile device) programmed to implement virtual assistant 300 has limited resources (e.g., processing power, memory, etc.). When at least a portion of the functionality performed by ASR engine 310, NLU component 312, and TTS engine 314 is performed remotely by one or more remote computing devices, the remote computing device(s) may be provided with any suitable information accessible by virtual assistant 300 (e.g., voice input provided to the virtual assistant 300) for performing such functionality.

In some embodiments, the virtual assistant 300 may be configured to interact with a user via one or more graphical user interfaces. The virtual assistant may use a graphical user interface (GUI) to obtain input from a user and/or to present visual output (text and/or graphics) to the user. Such functionality may be performed at least in part by graphical user interface (GUI) component 306 of virtual assistant 300. GUI component 306 may be configured to obtain input from the user and/or present information to a user using any suitable type(s) of graphical user interface.

Virtual assistant 300 comprises user identification module 313 configured to obtain, from the user with which the virtual assistant is interacting, information identifying the user. User identification module 313 may cause the virtual assistant 300 to prompt the user with which it is interacting to provide any of numerous types of identification information, examples of which are provided herein.

Virtual assistant 300 comprises user profile module 316 configured to provide virtual assistant 300 with access to information in one or more user profiles. User profile module 316 may be configured to access user profiles stored locally on the device programmed to implement virtual assistant 300 and/or remotely on one or more other devices to which the device programmed to implement virtual assistant 300 has access.

User profile module 316 may be configured to access a remotely stored user profile at least in part by sending a request (e.g., to server 110 or to portable device 152) to access at least some information in the remotely stored user profile. The request may specify the information in the user's profile that the virtual assistant wishes to access. As one non-limiting example, the request may specify that the virtual assistant wishes to access virtual assistant persona information stored in the user profile so that the virtual assistant may adopt a personalized virtual assistant persona when interacting with the user. As another non-limiting example, the request may specify that the virtual assistant wishes to access all the information in the user's profile. Additionally or alternatively, the request may include information identifying the user whose profile the user profile module 316 is requesting to access and/or information identifying the device on which the virtual assistant is executing.

User profile module 316 may access information in any user profile stored locally on the device programmed to implement virtual assistant 300. Virtual assistant 300 may store one or more user profiles locally in profile storage 318 and user profile module 316 may access information in any of the profiles stored locally therein. In some embodiments, user profile module 316 may access a profile of a user at a specific time, for example, when the user is logged in to the device programmed to implemented virtual assistant 300. In this way, in some embodiments user profile module 316 may not access information in a profile of a user, when another user is logged in to the device programmed to implement virtual assistant 300.

Although in the illustrated embodiment, profile storage 318 is shown as storing three user profiles (i.e., user profiles 318a, 318b, and 318c), profile storage 318 may store any suitable number (e.g., zero, one, two, four, at least five, at least ten, at least 25, etc.) of user profiles, as aspects of the disclosure provided herein are not limited in this respect.

When a user profile may be accessed locally or remotely, the user profile module 316 may determine which copy of the user profile to access (e.g., based on which copy has been more recently updated, time required to access the user's profile remotely, and/or any other suitable factor(s)). The user profile module 316 may synchronize local and remote copies of the user's profile (e.g., when the user profile module determines that a threshold number of changes have been made to the local and/or remote copy of the user's profile or based on some other criteria).

Illustrative virtual assistant 300 comprises IVR interaction module 320 used by the virtual assistant to conduct calls between a caller using the device programmed to implement virtual assistant 300 and an IVR system. The IVR interaction module 320 may receive information from the IVR system, provide the IVR system with information entered by the caller, and/or provide the IVR system with at least some information, desired by the IVR system, from the caller's profile. This is discussed in more detail with reference to FIGS. 10-12 below.

Figure 3B:
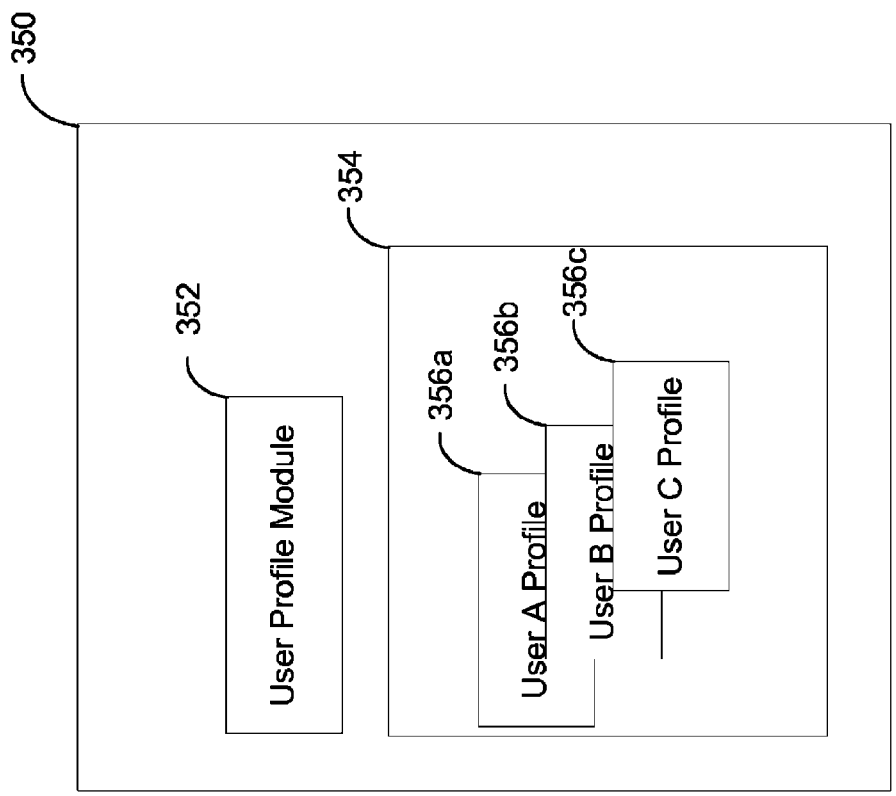
FIG. 3B is a block diagram of software components of an illustrative server configured to communicate with one or more virtual assistants, in accordance with some embodiments of the disclosure provided herein.

As previously described, some embodiments are directed to a system configured to provide virtual assistants executing on different devices with access to at least some information in a user's profile. Embodiments of such a system may be implemented in hardware, software, or as a combination of hardware and software (e.g., as processor-executable instructions stored on at least one non-transitory computer readable medium that, when executed by one or more processors, perform the functionality of a system configured to provide virtual assistants executing on different devices with access to at least some information in a user's profile). One embodiment of such a system implemented at least in part by using software is illustrated in FIG. 3B, which shows a block diagram of software components of a system 350 configured to provide different virtual assistants with access to at least some information in a user's profile. It should be recognized that the software components shown in FIG. 3B are merely illustrative and that system 350 may be implemented by using other software components in addition to or instead of the software components shown in FIG. 3B. Any suitable computing device (e.g., server 110), or a collection of two or more computing devices, may be programmed to implement system 350, as aspects of the disclosure provided herein are not limited in this respect.

System 350 comprises user profile module 352 configured to provide virtual assistants executing on one or more other devices (e.g., computing devices 104*a*, 104*b*, and 104*c*) with access to information in one or more user profiles (e.g., information in profiles of users 102*a* and 102*b*). User profile module 352 may be configured to access user profiles in profile storage 354, which is shown in FIG. 3B as storing three user profiles 356*a*, 356*b*, and 356*c*. Profile storage 354 may store any suitable number (e.g., at least ten, at least 100, at least 1000, at least 10,000, at least 50,000, etc.) of user profiles, as aspects of the disclosure provided herein are not limited in this respect.

System 350 may store user profiles in any suitable way and in any suitable format. In some embodiments, system 350 may store user profiles using one computing device (e.g., a server) or multiple computing devices (e.g., multiple servers). In some embodiments, system 350 may be part of, or configured to interface with, a cloud-computing environment and may store at least some of the user profiles in the cloud-computing environment.

User profile module 354 may be configured to receive requests from virtual assistants requesting access to at least some information stored in the profiles of one or more users. As described above, a request for access to information in a user's profile may identify the user to whose profile access is being requested (e.g., by providing information identifying the user) and may specify the information in the user's profile that the virtual assistant wishes to access. In response to receiving a request to access information in a user's profile, the user profile module 354 may perform processing (on its own or together with one or more other devices such as one or more authentication servers) to determine whether permission to access the information in the user's profile request is to be granted, and then either grant or deny the request on the basis of the determination.

Figure 4:
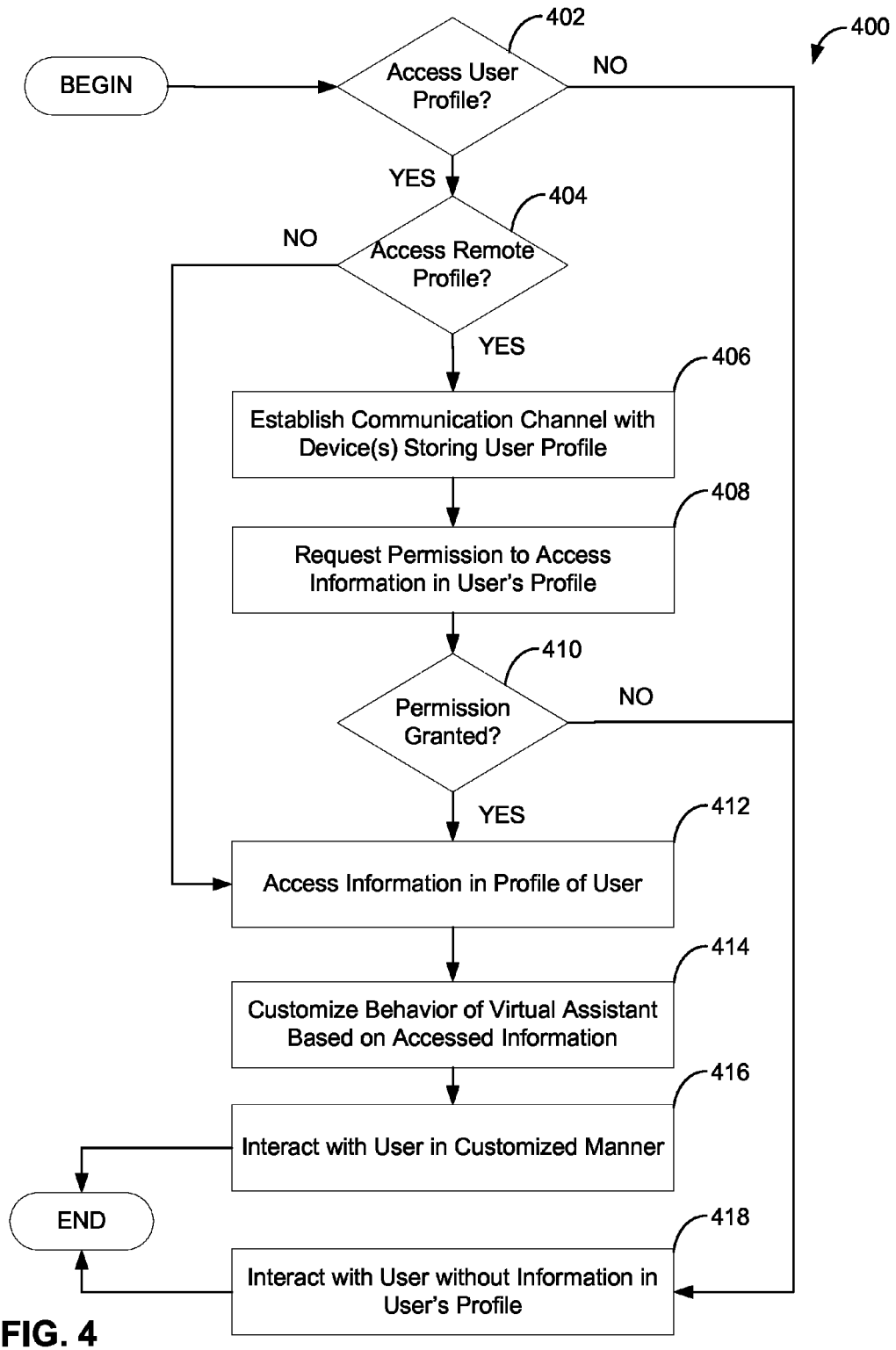
FIG. 4 is a flowchart of an illustrative process, performed by a device programmed to implement a virtual assistant, for customizing the behavior of the virtual assistant when interacting with a user based on at least some information in the user's profile, in accordance with some embodiments of the disclosure provided herein.

As previously described, in some embodiments a virtual assistant may customize, based on at least some information in the user's profile, its behavior when interacting with the user. One such embodiment is illustrated in FIG. 4, which shows a flowchart of an illustrative process 400 that can be performed on any computing device programmed to implement at least one virtual assistant and, for example, may be performed by a virtual assistant implemented on any of computing devices 104*a*, 104*b*, 104*c*, 156, and 158 described with reference to FIGS. 1A and 1B.

Process 400 begins at decision block 402, where a virtual assistant determines whether to access a user's profile. In some embodiments, the virtual assistant may determine to access a user's profile when the user invokes the virtual assistant. The user may invoke the virtual assistant by providing voice input comprising a particular utterance (e.g., a "wake-up" keyword or phrase) that when received by the computing device executing process 400 causes the virtual assistant to be invoked or by providing any other suitable type of input (e.g., pressing a button, tapping a screen, shaking the device, etc.) that causes the virtual assistant to be invoked. In some embodiments, a virtual assistant is not limited to determining whether to access the user's profile upon being invoked by the user and may determine to access the user's profile while interacting with the user and/or at any other suitable time.

When it is determined, at decision block 402, that the virtual assistant is not to access the user's profile, process 400 proceeds to act 418, where the virtual assistant interacts with the user without using any information in the user's profile.

On the other hand, when it is determined that the virtual assistant is to access the user's profile, process 400 proceeds to decision block 404, where it is determined whether the virtual assistant is to access a local copy of the user profile stored on the device executing the virtual assistant or a remote copy of the user profile store on another device or devices. This determination may be made in any suitable way. For example, if the device executing the virtual assistant does not have a local copy of the user's profile, if the local copy of the user's profile has not been updated for a threshold period of time, or if the virtual assistant determines that a remote copy of the user's profile has been updated more recently than the local copy of the user's profile, the virtual assistant may determine to access the remote copy of the user's profile.

When it is determined, at decision block 404, that the virtual assistant is to access a local copy of the user's profile, process 400 proceeds to acts 412 and 414, where the virtual assistant accesses information in the user's profile and customizes, based on the accessed information, its behavior when interacting with the user, and subsequently to act 416, where the virtual assistant interacts with the user in accordance with the customized behavior. On the other hand, when it is determined that the virtual assistant is to access a remote copy of the user's profile, process 400 proceeds to act 406, where the device executing the virtual assistant establishes a communication link with another computing device that has access to a remote copy of the user's profile.

In some embodiments, the device executing the virtual assistant may establish a communication link (e.g., via a network such as the Internet), with a computing device (e.g., server 110 described with reference to FIG. 1A) that has access to a remote copy of the user's profile. In other embodiments, the device executing the virtual assistant may establish a direct communication link (examples of which have been provided above) with a portable device (e.g., portable device 154 described with reference to FIG. 1B) that stores a copy of the user's profile thereon. The device executing the virtual assistant may attempt to establish a communication link with a portable device storing a copy of the user's profile thereon, when the device executing the virtual assistant detects and/or is alerted to the presence of the portable device.

Next, process 400 proceeds to act 408, where the virtual assistant requests permission from the device storing a copy of the user's profile to access at least some of the information stored in the user's profile. As previously described, the request may include information identifying the user whose profile the virtual assistant is requesting to access, and/or information identifying the device on which the virtual assistant is executing. Additionally, in some embodiments, the request may specify particular information in the user's profile that the virtual assistant wishes to access (e.g., virtual assistant persona information, information about the user's interests, etc.). Though it should be appreciated that a request for access to at least some information in the user's profile may include any other suitable information, as aspects of the disclosure provided herein are not limited in this respect. Also, in some embodiments, the request may not specify particular information in the profile that the virtual assistant wishes to access and may be a request to access any information in the profile.

Next process 400 proceeds to decision block 410, where it is determined if permission to access the user's profile has been granted. If the virtual assistant did not obtain permission to access the user's profile, process 400 proceeds to act 418, where the virtual assistant interacts with the user without using any information in the user's profile.

On the other hand, if permission to access the user's profile has been granted, process 400 proceeds to acts 412 and 414, where the virtual assistant accesses information in the user's profile and customizes, based on the accessed information, its behavior, and subsequently to act 416, where the virtual assistant interacts with the user in accordance with the customized behavior.

The virtual assistant may customize its behavior based on the accessed information in any suitable way, examples of which were discussed above. For example, as previously described, the virtual assistant may access information specifying a virtual assistant persona in the user's profile and adopt the virtual assistant persona when interacting with the user. The virtual assistant persona may specify a voice font, a speaking style, and/or a text style, and the virtual assistant may generate speech in accordance with the specified voice font and/or speaking style and may generate text in accordance with the specified text style. Additionally or alternatively, the virtual assistant may present a personalized GUI to the user in accordance with GUI-related information specified for the virtual assistant persona in the user's profile.

As discussed above, in some embodiments, the virtual assistant may customize its behavior, when interacting with the user, by customizing the content of information the virtual assistant presents to the user. For example, as previously described, the virtual assistant may access information indicative of the user's interests in the user's profile and customize its behavior by tailoring the information it presents to the user to those interests. For example, the virtual assistant may provide the user with information related to one or more topics that, according to the user's profile, the user is interested in or omit information on topics in which the user is disinterested. As another example, the virtual assistant may recommend to the user media content of the type that, according to the user's profile, the user enjoys. The virtual assistant may provide the user with information related to one or more topics, a recommendation, and/or any other suitable information proactively, without user input, or in response to user input, as aspects of the disclosure provided herein are not limited in this respect.

In some embodiments, the virtual assistant may use information in the user's profile to communicate in a way that may convey a sense of empathy to the user. The virtual assistant may convey a sense of empathy by customizing the content of information it presents to the user and/or style in which it presents information to the user. For example, in some embodiments, the virtual assistant may use words or phrases which indicate the virtual assistant's understanding of what is important to the user. As a non-limiting example, the virtual assistant may access information in the user's profile indicating that the user is a fan of the Boston Celtics basketball team and, in response to the user asking about the score of the Celtics game, the virtual assistant may generate "Alright! The C's are crushing the Lakers 46-33." On the other hand, if the Celtics are down, the virtual assistant may generate "Awww man. The C's are trailing the Lakers 88-80 with two minutes left in the $4^{th}$ quarter. There is still hope!" In this way, the virtual assistant empathizes with the user by conveying to the user its understanding that the user is a Celtic's fan.

As another example, in some embodiments, the virtual assistant may access information in the user's profile indicating what type of informational content is important to the user and change its speaking style to reflect that level of importance. For instance, the virtual assistant may generate speech having a more serious tone if the information being provided is urgent and/or important and a less serious tone if it is not. As a specific non-limiting example, the virtual assistant on the user's car may access information in the user's profile indicating that the user wishes to avoid traffic jams and may generate the message "There is traffic congestion ahead, shall I recalculate the route?" in a serious tone (e.g., in a more serious tone than a message about the weather).

In some embodiments, the virtual assistant may update the user's profile based on information obtained by the virtual assistant while interacting with the user. The virtual assistant may update the user's profile by removing information from, adding information to, and/or editing information in the user's profile. As one non-limiting example, the virtual assistant may update the user's profile by adding input provided to the virtual assistant by the user to the dialog history information in the user's profile. As another non-limiting example, the user may provide to the virtual assistant information related to a task (e.g., listening to music or an audio book, watching a movie, looking at a picture, accessing a website, scheduling an appointment, etc.) performed at least in part by using another application program executing on the device (e.g., a music player application, a movie player application, a photo application, a web-browser application, a calendar application, etc.) and the virtual assistant may add the information related to the task to the user profile. Information related to a task may include information identifying the task (e.g., playing an audio book, music, a movie, etc.), information specifying one or more inputs provided by the user for performance of the task (e.g., name of the an audio book, music, a movie, etc.), information specifying what portion of the task has been or has not been performed (e.g., how much of the audio book, music, a movie, etc., has been played). As described in more detail below, storing such information in the user's profile may allow another computing device to access this information and continue performance of the task.

Figure 5:
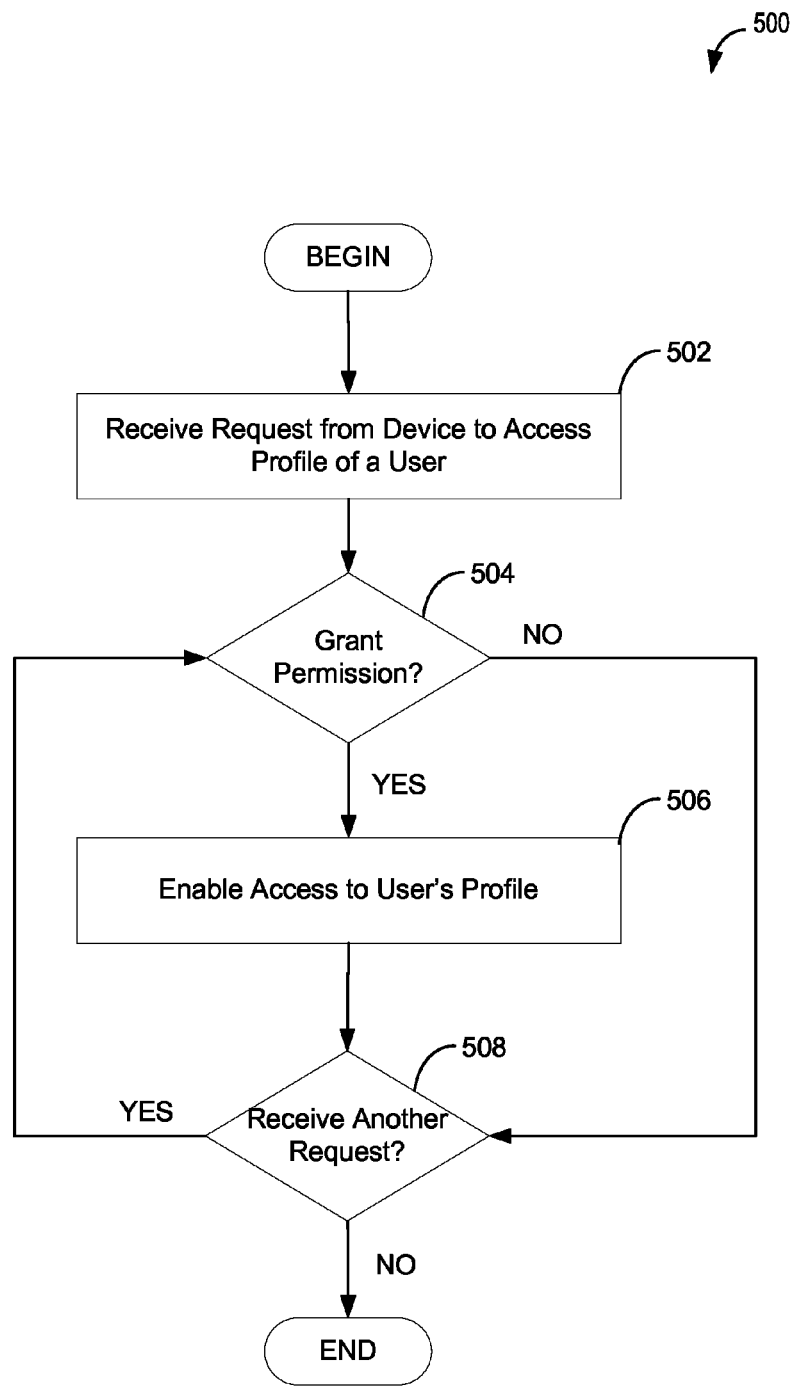
FIG. 5 is a flowchart of an illustrative process, performed by at least one device storing a user's profile, for providing at least one device programmed to implement a virtual assistant with access to the user's profile, in accordance with some embodiments of the disclosure provided herein.

As previously described, in some embodiments, a system may provide virtual assistants executing on different devices with access to at least some information in a user's profile. One such embodiment is illustrated in FIG. 5, which shows a flowchart of an illustrative process 500 that can be performed on any computing device programmed to provide one or more other computing devices with access to at least some information in a user's profile and, for example, may be performed by server 110 and portable device 154 described with reference to FIG. 1A and FIG. 1B, respectively.

Process 500 begins at act 502, where the computing device executing process 500 receives, from a virtual assistant executing on another computing device, a request for permission to access the profile of a particular user. The request may be a request to read information from the user's profile and/or to write information to the user's profile. As previously described, the received request may include any of the following information: information identifying the user whose profile the virtual assistant is requesting to access, information identifying the computing device on which the virtual assistant is executing, the information in the user's profile that the virtual assistant wishes to access, and/or any other suitable information.

In response to receiving a request to access the profile of a particular user, process 500 proceeds to decision block 504, where it is determined whether the requested permission for access to the user's profile is to be granted. This determination may be made based on information in the received requested in any suitable way. As one non-limiting example, information in the request identifying the user (e.g., login and password information, biometric information, and/or any other suitable identifying information) may be used to attempt to authenticate the user and, if the user is authenticated, permission to access the user's profile may be granted. As another non-limiting example, permission to access a user's profile may be granted when the device (or the type of device) from which the request for access originated is specified in the user's profile as one that may access the user's profile. As yet another example, permission to access a user's profile may be granted when the user is authenticated based on information in the request identifying the user and the user's profile indicates that the device from which the request for access originated may access the user's profile. As yet another example, permission to access particular information in the user's profile may be granted when it is determined that the device from which the request originated may have access to the particular information. For instance, a device belonging to the user (e.g., the user's smart phone, laptop computer, etc.) may have access to the user's personal information stored in the user's profile, whereas other devices (e.g., a computing device in a rental car, in a hotel room, in an Internet café, etc.) may not have access to the user's personal information.

In some embodiments, the information in the request does not uniquely identify a user such that the user profile to which access is being requested may not be uniquely identified. Rather, a set of user profiles may be identified. In such instances, information identifying the device from which the request originated may be used to identify the user profile, among the set of user profiles, to which access is being requested. This may be done in any suitable way. In some embodiments, it may be determined, based on information identifying the device from which the request originated, that a particular profile in the set of user profiles specifies that the device may have access to the user's profile. In this way, the user profile to which access is being requested may be uniquely identified and permission to access information in that user profile may be granted.

In some embodiments, a request to access a user's profile may be received from a computing device executing a virtual assistant interacting with the user. However, aspects of the disclosure provided herein are not limited in this respect, as the request to access information may be received from any other suitable device. In some embodiments, a third party may wish to access information in the user's profile. As one non-limiting example, a hotel may wish to access the user's profile to determine/specify the type of hotel room the user prefers, when the user stayed or is to stay at the hotel, the rate the user paid or is to pay to stay at the hotel, etc. As another non-limiting example, a car rental company may wish to access the user's profile to determine/ specify the type of car the user prefers to drive. As yet another non-limiting example, a virtual assistant interacting with a third party (e.g., another person who is a friend of the user) may wish to access information in the user's profile to customize its behavior when interacting with the third party (e.g., the friend's virtual assistant may wish to schedule an event between the friend and the user and may wish to access information about the user's availability in the user's profile to do so). There are many other examples of third parties (e.g., grocery store, credit card company, telephone company, airline company, etc.) who may wish to access the user's profile, as aspects of the disclosure provided herein are not limited in this respect. In some embodiments, a third party may be granted permission to access the user's profile when the user's profile specifies that the third party is allowed to access the user's profile. For example, if a user frequently stays at Hilton Hotels, the user may grant Hilton Hotels permission to access at least some information in the user's profile.

The above examples of how a determination may be made to grant access to a user's profile are illustrative and non-limiting and the determination to grant access to the user's profile may be made in any suitable other way.

When it is determined, at decision block 504, that permission to access the user's profile is to be denied, process 500 proceeds to decision block 508, where it is determined whether another request for access the profile of any user has been received. On the other hand, when it is determined that the permission to access the user's profile is to be granted, process 500 proceeds to act 506, where the computing device enables reading and/or writing of information in the user's profile.

After act 506 (or after following the "NO" branch from decision block 504), process 500 proceeds to act 508, where it is determined whether another request for access the profile of any user has been received. When it is determined that another request has been received, process 500 returns to decision block 504 to process it in the manner discussed above. When it is determined that no other request has been received, process 500 completes.

III. Continuing Tasks Across Devices

As previously described, information stored in a user's profile may enable a task being performed on one device to continue to be performed on one or more other devices. The user's profile may contain information identifying a task being performed on one device and when the user is near another device that may continue performance of the task, the other device may access information in the user's profile identifying the task being performed and continue performance of the task.

As one non-limiting example, the user may be listening to music on his/her smart phone and the user's profile may include information indicating that the user is listening to music on his/her smart phone. When the user comes home, the user's stereo system may access the user's profile, determine that the user was listening to music on his/her smart phone, and determine (either automatically or based on input from the user) to continue playing the music (e.g., the same song in the same place in the same playlist, the same radio station, etc.) that the user was listening to.

As another non-limiting example, the user may be listening to an audio book in his/her car and the user's profile may include information indicating that the user is listening to the audio book in his/her car. When the user arrives at his/her hotel, the hotel's infotainment system may access the user's profile, determine that the user was listening to an audio book in his/her car, and determine (either automatically or based on input from the user) to continue playing the audio book in the hotel room from the location in the audio book where the user left off.

As yet another non-limiting example, the user wishes to perform the task of going to a restaurant. The user may use his/her smart phone to make a restaurant reservation and the user's profile may include information indicating that the user made the restaurant reservation. Later, when the user gets into his car the car's navigation system may access the user profile and determine, either automatically (e.g., based on the time and/or location of the user) or based on user input that the user wishes to drive to the restaurant. The navigation system may then provide the user with directions to the restaurant.

In some embodiments, performance of a user's task by an application program on one device (e.g., a music player on the user's smart phone) may be continued by another application program of the same type on another device (e.g., a music player on the user's laptop computer). In other embodiments, performance of a user's task an application on one device (e.g., an application program on the user's smart phone that may be used to make a restaurant reservation) may be continued by another application program of a different type on another device (e.g., an application program in the user's car for navigating the user to the restaurant).

Figure 6:
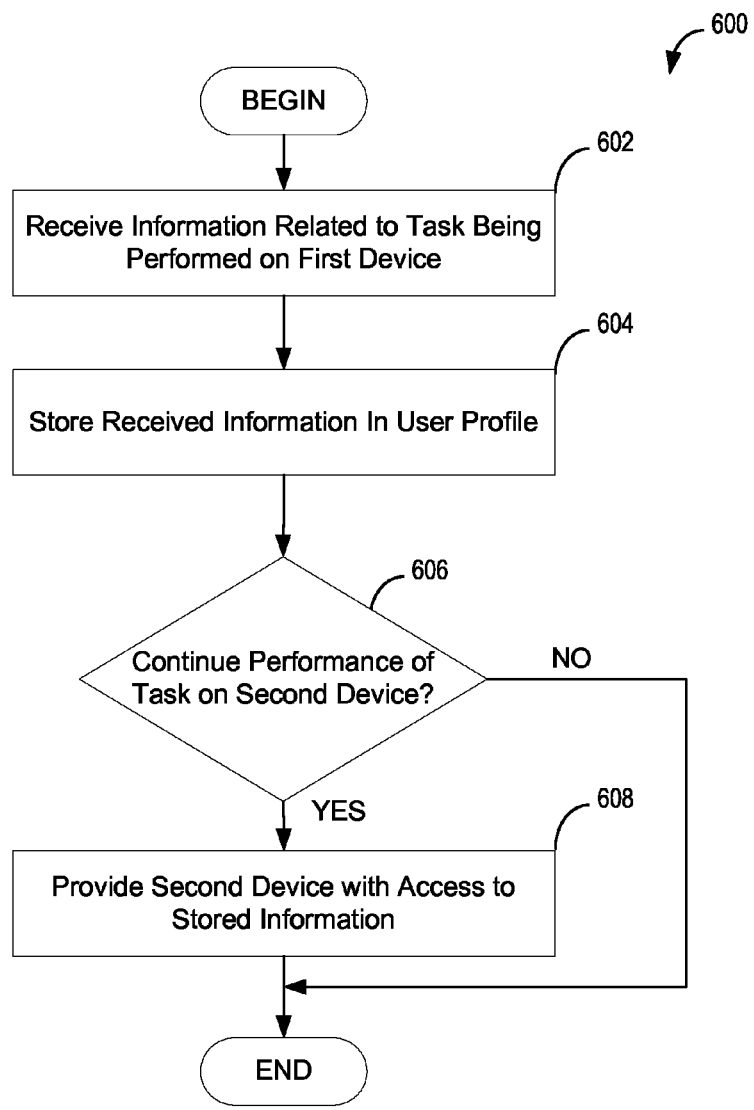
FIG. 6 is a flowchart of an illustrative process for continuing, on a second device, the performance of a task initiated on a first device, in accordance with some embodiments of the disclosure provided herein.

FIG. 6 is a flowchart of an illustrative process 600 for continuing, on a second device, the performance of a task being performed on a first device, in accordance with some embodiments of the disclosure provided herein. Process 600 may be performed by the first device (e.g., the user's cell phone) or by a third computing device (e.g., server 110 described with reference to FIG. 1A) configured to communicate with the first device and the second device and programmed to provide one or more other computing devices with access to at least some information in a user's profile.

Figure 2:
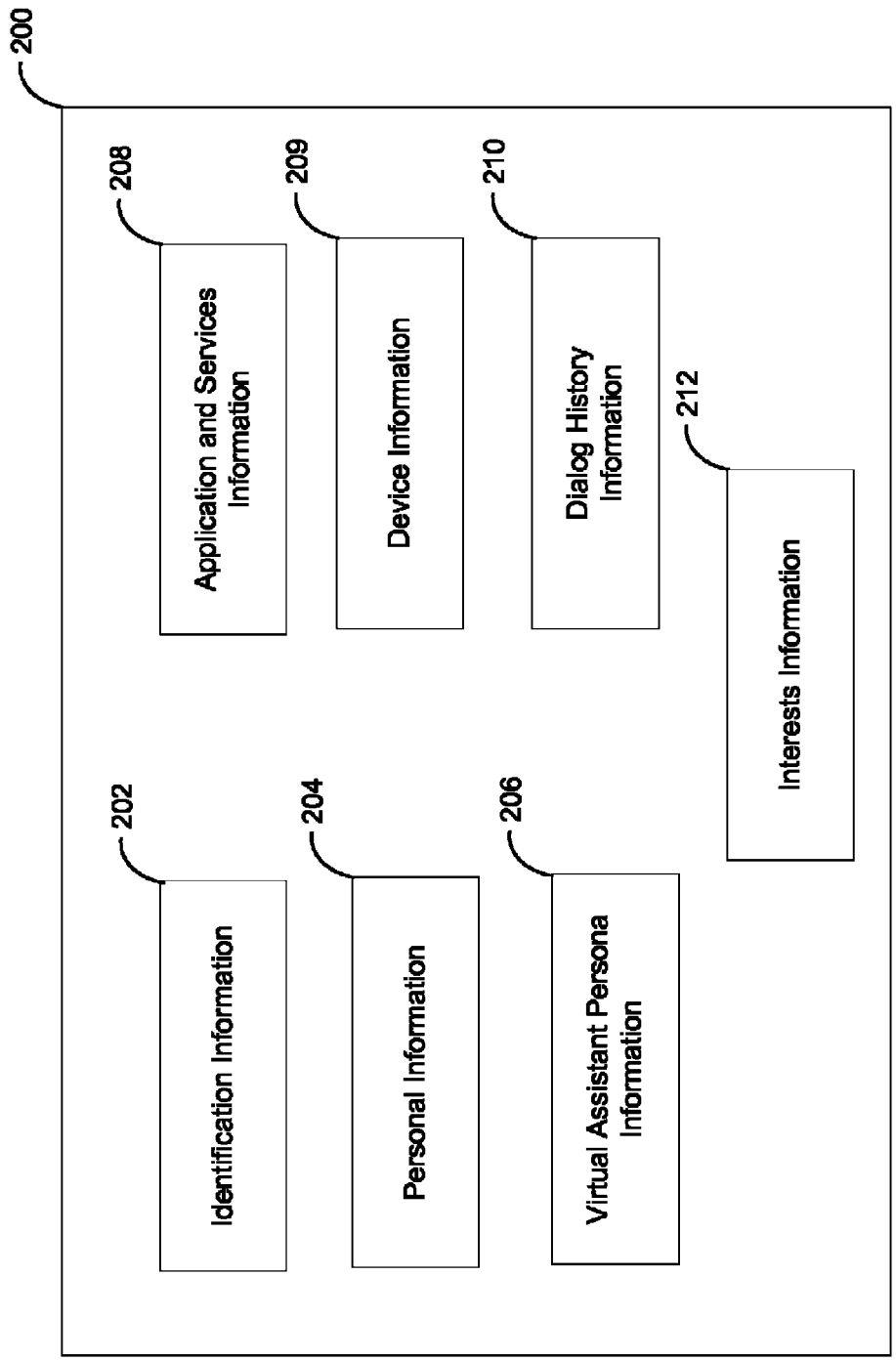
FIG. 2 is a block diagram of information stored in an illustrative user profile, in accordance with some embodiments of the disclosure provided herein.

At act 602, the computing device executing process 600 receives information related to a task being performed on a first device and, at act 604, stores the received information in the user's profile (e.g., in application and services information 208 described with reference to FIG. 2). The first device may be any suitable computing device with which the user may interact by using a virtual assistant executing on the device, examples of which are provided herein. The information related to a task being performed on the first device may be provided to the computing device executing process 600 by the virtual assistant and/or any other suitable software program executing on the first device.

Information related to a task may be any suitable information that, when provided to another device, may allow the other device to continue performance of the task. For example, as previously described, information related to a task may include information identifying the task (e.g., playing an audio book, going to a restaurant for dinner, etc.), information specifying one or more inputs provided by the user for performance of the task (e.g., information identifying the audio book to play, information for making a reservation at the restaurant), information specifying what portion of the task has been or has not been performed (e.g., how much of the audio book has been played, whether the restaurant reservation has been made), and/or any other suitable information that may be used by another device to continue performance of the task. Information specifying what portion of the task has been performed by one device may allow another device to continue performance of the task without repeating performance of the portion that has been performed (e.g., continuing to play an audio book without replaying the portion of the audio book already listened to by the user).

Next, process 600 proceeds to decision block 606, where it is determined whether performance of the task is to be continued on another device. The determination to continue performance of a task on another device may be made in any suitable way. In some embodiments, the determination to continue performance of a task on another device may comprise identifying one or more devices that are available for continuing performance of the task (e.g., by communicating with the device(s) or receiving information from a server indicating which device(s) are available) and determining whether to continue performance of the task on one of the available devices. In some embodiments, the computing device executing process 600 may obtain information specifying the user's location (e.g., from one or more of the devices proximate the user and/or from location services on the computing device) and may determine, automatically or based at least in part on user input, that performance of the task is to be continued on the other device, when the user is sufficiently near (e.g., within a threshold distance of) the other device. For example, when a user who was listening to an audio book in his/her car comes home, the computing device executing process 600 may obtain information indicating that the user is at home (rather than in his/her car) and that the stereo system in the user's home may continue to play the audio book. The computing device executing process 600 (e.g., the user's cell phone, a server with access to information specifying the user's location, etc.) may communicate with a virtual assistant executing on the stereo system and cause the stereo system to automatically continue playing the audio book or to proactively ask user whether the user wishes that the stereo system continue playing the audio book.

In some embodiments, the computing device executing process 600 may determine that performance of the task is to be continued on the other device based on input from the user. The user may interact with a virtual assistant on the first device or on the other device to indicate that the user wishes the task to be continued on the other device. For example, a user listening to music on his/her smart phone may provide input either to his smart phone (e.g., via a virtual assistant) or to his/her stereo system (e.g., by pushing a button) that the user wishes to continue listening to the music on the stereo system. In some instances, the user's profile stores information indicating whether the determination to continue performance of a task on another device should be made automatically or based on user input.

In some embodiments, the determination to continue performance of a task on another device may be made based on input received from the device that will continue to perform the task, the input indicating that the device is to continue performance of the task. The device that will continue to perform the task may make such a determination in any suitable way such as, for example, based on proximity of the user to the device, based on user input to the device, based on preference settings added by the user to his/her profile, based on preference settings in the profile automatically learned by the virtual assistant, and etc. For example, a user may listen to an audio book in his/her car, come home, and indicate to his stereo system (e.g., via a virtual assistant executing on the stereo system, by pushing a button on the stereo system, etc.) that the stereo system is to continue playing the audio book. In response to receiving such input from the user, the stereo system may notify the system executing process 600 (e.g., a server such as server 110 described with reference to FIG. 1A or a portable device such as portable device 154 described with reference to FIG. 1B) that the stereo system is to continue playing the audio book. It should be appreciated that the above-described ways of determining that performance of a task is to be continued on another device are illustrative and the determination may be made in any other suitable way, as aspects of the disclosure provided herein are not limited in this respect.

When it is determined that performance of the task is to be continued on another device, process 600 proceeds to act 608, where the other device is provided with access to information in the user's profile related to the task. When it is determined that performance of the task is not to be continued on some other device, the computing device executing process 600 ends. However, the information stored at act 604 is retained so that performance of the task may be continued on some other device at a later point in time.

IV. Social Supergraph

The Applicants have appreciated that an improved user experience could be provided if a virtual assistant were to have access not only to information in the profile of user with whom the virtual assistant is interacting, but also to information related to the user's contacts (e.g., friends, acquaintances, business associates, people connected to the user via one or more social networking services, etc.). Access to information related to the user's contacts may allow the virtual assistant to present the user with information of interest to his/her contacts, recommend to the user media content that his/her contacts enjoy, schedule an event (e.g., a meeting, a phone call, etc.) between the user and one or more of his/her contacts, and/or perform any of numerous other types of actions that would lead to an improved and increasingly personalized experience for the user when interacting with the virtual assistant.

Accordingly, in some embodiments, the virtual assistant may customize its behavior when interacting with the user based on at least some information related to one or more other users associated with the user. Information related to the other user(s) may be any information in the profile(s) of the other user(s), and/or any other suitable information. The other user(s) may be associated with the user in any suitable way and, in some embodiments, may be associated with the user via a network of users that was constructed based at least in part on information in the user's profile and the profiles of the other user(s), as described below.

In some embodiments, a network of users may be represented by a graph of the network (a network graph) comprising a set of nodes and a set of edges connecting at least some nodes in the set of nodes. A node in the network graph may represent a user and an edge connecting two nodes may represent a connection between the two users represented by the nodes. Each node may be associated with data in the profile of the user the node is representing. As such, the network of users encodes information about each user in the network and information about connectivity among users in the network. The network of users may be encoded by any data structure for encoding graphs or any other suitable data structure(s), as aspects of the disclosure provided herein are not limited in this respect.

In some embodiments, a system configured to access user profiles of a set of users (e.g., server 110 described with reference to FIG. 1A) may use information in the profiles of the users to construct a network of users. This may be done in any suitable way. For example, in some embodiments, the system may construct a network of users by performing the following steps for each of at least some (e.g., all) users in the set of users: (1) add a node to the network graph for the user; and (2) when information in the profile of the user indicates that the user is associated with another user represented by a node in the network graph, connect the two nodes representing these users in the network graph.

Non-limiting examples of information in the profile of one user ("user A") indicating that the user is associated with another user ("user B") include information indicating that users A and B are connected via at least one social networking service (e.g., users A and B are connected via Facebook®, users A and B are connected on LinkedIn®, user A is following user B on Twitter® and/or vice versa, etc.), information indicating that user B is a contact of user A (e.g., user A's profile contains user B's contact information such as his/her e-mail address, mailing address, phone number, etc.), and/or any other suitable information indicating that user A and user B are associated.

As may be appreciated from the above, the system configured to access user profiles of a set of users may construct a network of users that is not a subset of any single existing network of users. For example, the constructed network may include connections between people that are connected via a first social network (e.g., Facebook®), but not via second social network (e.g., LinkedIn®) and include connections between people that are connected via the second social network, but not via the first social network. Accordingly, the network graph of the constructed network is neither a subgraph of the network graph representing the first social network nor a subgraph of the network graph represented the second social network. Rather, the network graph representing the first social network and the network graph representing the second social network may each be subgraphs of the network graph of the network constructed in accordance with the techniques described herein. In that sense, the network graph of the constructed network may be considered a network "super-graph."

Figure 7:
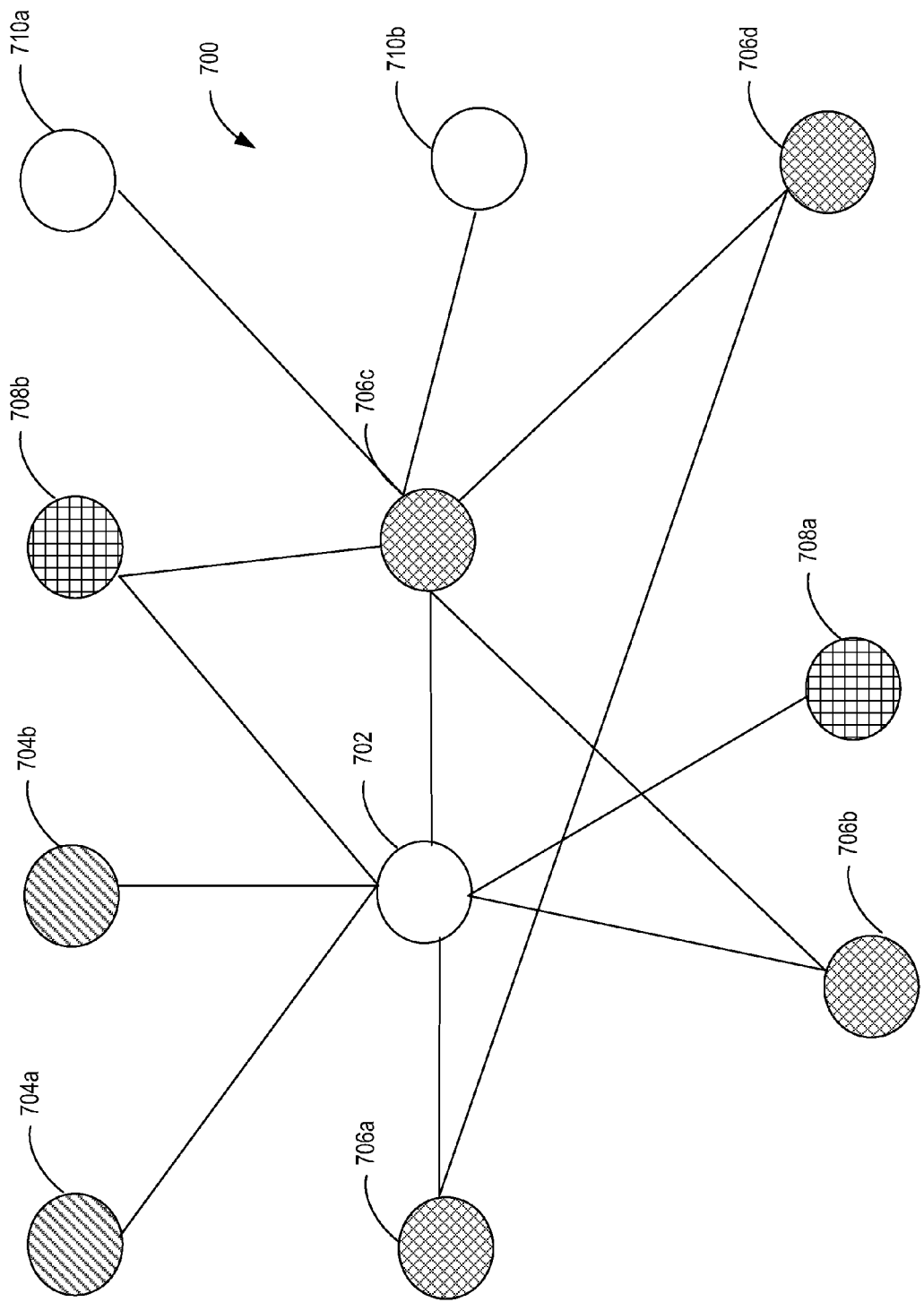
FIG. 7 is a diagram illustrating a network of users created based at least in part on the information in their profiles, in accordance with some embodiments of the disclosure provided herein.

One example of a network of users created based at least in part on information in their profiles is shown in FIG. 7. FIG. 7 shows a portion of illustrative network graph 700 comprising a node for each of users 702, 704*a*-*b*, 706*a*-*d*, 708*a*-*b*, and 710*a*-*b*. Like shading among any nodes connected to user 702 indicates that the users represented by these nodes are associated with user 702 in a similar way. For example, users 704*a* and 704*b* are each connected to user 702 via a first social networking service (e.g., LinkedIn) and, as a result, are indirectly connected (via user 702) in network graph 700. As another example, users 706*a*-706*d* are each connected to user 702 via a second social networking service (e.g., Facebook) different from the first network service and, as a result, are connected in network graph 700. As yet another example, users 708*a*-708*b* are contacts of user 702 (e.g., listed in the user's contacts application program) and, as a result, are connected in network graph 700. Users 710*a* and 710*b* are indirectly connected to user 702 in the network graph 700.

It should be appreciated that the number of users shown in network graph 700 is illustrative and not limiting, as a network graph may represent any suitable number of users (e.g., at least 10, at least 100, at least 1000, at least 10,000, at least 25,000, etc.) and any suitable number of connections among them.

Figure 8:
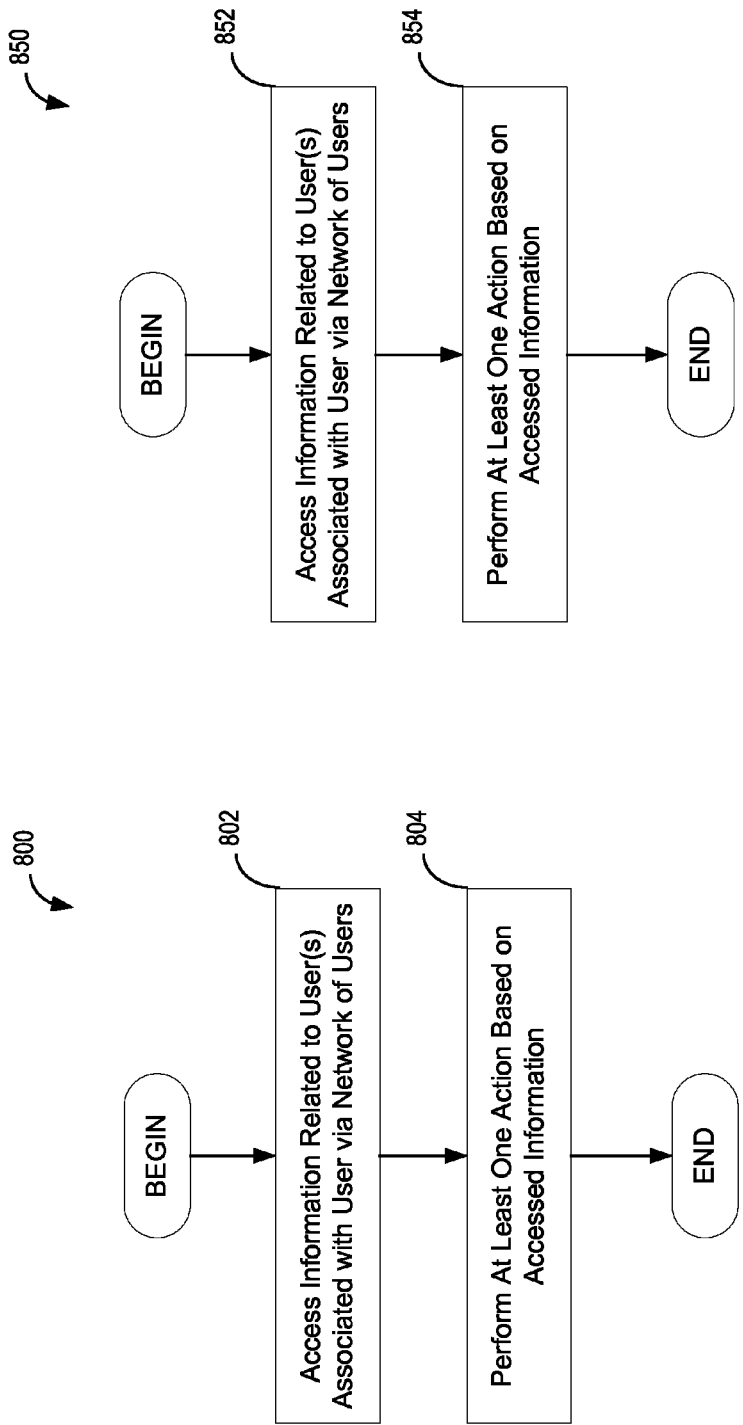
FIG. 8A is a flowchart of an illustrative process, performed by a virtual assistant, for interacting with a user based on information related to one or more other users associated, via a network of users, with the user, in accordance with some embodiments of the disclosure provided herein.
FIG. 8B is a flowchart of an illustrative process for causing a virtual assistant to interact with a user based on information related to one or more other users associated, via a network, with the first user, in accordance with some embodiments of the disclosure provided herein.

In some embodiments, a virtual assistant may customize its behavior when interacting with a user based on information related to one or more other users associated with the user via a network of users. The virtual assistant may customize its behavior by performing any of numerous types of actions based on the accessed information. One such embodiment is illustrated in FIG. 8A, which is a flowchart of illustrative process 800 that can be performed on any computing device programmed to implement at least one virtual assistant, examples of which are described herein.

Process 800 begins at act 802, where a virtual assistant executing on a device may access information related to one or more other users associated, via a network of users, with a user of the device. The network of users may be any suitable network of users and, for example, may be a network of users constructed based at least in part on information in the profiles of the users, as described above.

The virtual assistant may access information related to one or more other users in any suitable way. In some embodiments, the device on which the virtual assistant is executing (e.g., computing device 104a) may be connected to one or more other computing devices (e.g., server 110) that may provide information related to the other user(s) to the virtual assistant. The virtual assistant may be provided with information related to the other user(s) in response to requesting such information or may be provided with such information by one or more other computing devices proactively, without having requested such information.

Information related to other user(s) associated with a user of the device may be any suitable type of information. The information may be accessed in and/or derived from information in the profiles of the other user(s). Non-limiting examples of information related to the other user(s) are provided below.

Information accessed at act 802 may be related to any suitable group of one or more users associated, via a network of users, with the user. As one non-limiting example, the group of users may include only users directly connected to the user via the network of users. As another non-limiting example, the group of users may include users within a certain distance (e.g., within a threshold number of degrees of separation) of the user in the network of users. As another non-limiting example, the group of users may be any group of users in the network of users having one or more things in common with the user (e.g., common interests, common geographical location, common age group, common history, common employer, characteristics, etc.). As another non-limiting example, the group of users may include users specifically specified by the virtual assistant (e.g., when requesting information about the schedule of specific people to schedule a meeting between them and the user).

In some embodiments, the virtual assistant may be interacting with the user (e.g., the virtual assistant may be engaged in a dialogue with the user) during act 802, while in other embodiments the virtual assistant may be executing on the device in the background during act 802. In either case, when the virtual assistant accesses information related to other user(s), the virtual assistant may proactively perform any suitable action (e.g., provide a notification to the user) without input from the user requesting that such an action be performed, based on the accessed information.

Accordingly, after the virtual assistant accesses information related to one or more other users at act 802, process 800 proceeds to act 804, where the virtual assistant may interact with the user of the device by performing one or more actions based on the accessed information. The virtual assistant may receive additional information for performing some types of actions. For example, when the action performed at act 804 involves presenting additional information to a user, the virtual assistant may obtain the additional information from one or more other computing devices (e.g., server 110). Examples of these and other types of actions are provided below. After the virtual assistant performs the actions, process 800 completes.

As one non-limiting example, information accessed at act 802 may at least partially specify availability of one or more other users (e.g., the information may specify the schedule of some of the user's friends on one or more evenings, the schedule of one or more of the user's co-workers during one or more work days, the calendar of one or more other users, the travel plan of one or more other users, etc.). At act 804, the virtual assistant may try to schedule an event (e.g., a meeting, a phone call, etc.) between the user and the other user(s) based at least in part on the information specifying the availability of the other user(s).

As another non-limiting example, information accessed at act 802 may identify a planned location of one or more other users at future time (as opposed to merely tracking the present locations of the other user(s)). For example, the information accessed at act 802 may specify that a user's out of town friend will be coming to town on a particular day, that some of the user's friends plan to meet at a particular venue at a certain time, etc. As another example, the user may be travelling (e.g., driving) and the information accessed at act 802 may identify that one or more of the user's contacts will be near a future location of the user along his travel route. The planned location of a user may be obtained from information in the user's profile indicating the user's availability, information in the user's profile placed there by the user's navigation system, and/or from any other suitable source. At act 804, the virtual assistant may notify the user of the planned location of the other user(s) and/or try to schedule an event (e.g., a meeting, a phone call, etc.) between the user and the other user(s) at or near the planned location based on the accessed information.

As yet another non-limiting example, information accessed at act 802 may identify at least one topic of interest to one or more other users (e.g., a news topic, a sports-related topic, an entertainment related topic, etc.) and, at act 804, the virtual assistant may present information related to the identified topic of interest (e.g., a link to a webpage, a brief message, etc.) to the user. For example, the virtual assistant may provide the user with a link to a web page containing information about a news topic of interest to one or more other users. The link may be provided to the virtual assistant by one or more other computing devices such as server 110, and/or may be obtained by the virtual assistant in any other suitable way.

As yet another non-limiting example, information accessed at act 802 may identify media content (e.g., a movie, music, a television show, a newspaper article, a magazine article, etc.) that one or more other users enjoyed. At act 804, the virtual assistant may recommend the media content to the user. For example, the virtual assistant may present an preview of the media content (e.g., a movie trailer, a song sample, an article excerpt, etc.) generate a message informing the user that at least five of his friends have seen a particular movie, and/or recommend the media content in any other suitable way.

As yet another non-limiting example, information accessed at act 802 may identify a venue (e.g., a concert venue, a restaurant, a club, a gym, etc.) that one or more other users visited or would like to visit. At act 804, the virtual assistant may recommend that the user visit the venue. As yet another non-limiting example, information accessed at act 802 may indicate that multiple other users having one or more things in common with the user performed an action and, at act 804, the virtual assistant may recommend that the user perform the action and/or assist the user in performing the action. For example, if the user is a 37 year-old male living in the San Diego area and information accessed at act 802 indicates that multiple male users, aged 35-40, living in the San Diego area looked up information about a player on the San Diego Charger's football team, the virtual assistant may recommend that the user look up information about the player and/or present the user with information about the player.

As yet another non-limiting example, information accessed at act 802 may indicate the at least a threshold number of users are performing a task (e.g., searching for the stock price of Facebook®, searching for news about a particular person or place, viewing a popular video online, etc.). At act 804, the virtual assistant may proactively provide the user with information indicating which task the other users are performing (e.g., generate a message "People are looking up the stock price of Facebook®") and/or provide the user with other information related to the task (e.g., a link to a news story about the particular person or place, a link to the popular video, etc.).

As yet another non-limiting example, information accessed at act 802 may identify the user's closest friends and family members and their schedules. At act 804, the virtual assistant may determine a mutually convenient time to have a party and send an invitation to the identified friends and family members for a party to be held at the determined time.

As yet another non-limiting example, information accessed at act 802 may identify a product (e.g., a particular grill utensil, an electronic device, a bottle of wine, etc.) that one or more users have purchased. At act 804, the virtual assistant may recommend the product to the user (e.g., by presenting an advertisement, generating a message, etc.).

As yet another non-limiting example, information accessed at act 802 may indicate that another user, with similar interest to the user of the device on which the virtual assistant is executing, has joined the network of users (or any other social network such as LinkedIn®). At act 804, the virtual assistant may suggest to the user that the user establish a direct connection in the network of users (or other social network) with the other user.

It should be appreciated that the above examples are merely illustrative and that a virtual assistant may access any other suitable information related to one or more other users and perform any other suitable action(s) based on the accessed information.

In some embodiments, a computing device (e.g., server 110) may access information related to one or more other users associated with a user via a network of users, and cause a virtual assistant executing on another computing device (e.g., the user's smart phone) to perform one or more actions based on the accessed information. One such embodiment is illustrated in FIG. 8B, which is a flowchart of illustrative process 850 that can be performed on any suitable computing device (e.g., server 110) configured to communicate with other computing devices programmed to implement virtual assistants.

Process 850 begins at act 852, where the computing device executing process 850 may access information related to one or more other users associated with a particular user via a network of users. The network of users may be any suitable network of users and, for example, may be a network of users constructed based at least in part on information in the profiles of the users, as described above. Information accessed at act 852 may be related to any suitable group of users, examples of which have been described with reference to FIG. 8A. Any suitable information related to the other user(s) may be obtained at act 852, examples of which have been described with reference to FIG. 8A.

Next, process 850 proceeds to act 854, where the computing device executing process 850 may cause a virtual assistant executing on a device of the particular user (e.g., the user's smart phone) to perform one or more actions based on the information accessed at act 852. Examples of actions that a virtual assistant may be caused to perform have been described with reference to FIG. 8A.

The computing device executing process 850 may cause a virtual assistant on another device to perform an action by sending information (e.g., a message, a function call, etc.) to the other device indicating the action for the virtual to perform and the virtual assistant may perform the indicated action in response to receiving the message. The computing device executing process 850 may cause the virtual assistant on the other device to perform an action in any other suitable way, as aspects of the disclosure provided herein are not limited in this respect.

In some embodiments, causing the virtual assistant to perform certain types of actions may comprise providing additional information to the virtual assistant for performing those actions. For example, causing the virtual assistant to present an advertisement (e.g., for a product that other users have purchased) may comprise providing the virtual assistant with the advertisement. As another example, causing the virtual assistant to provide the user with a link to an article (e.g., about a topic of interests to other users) may comprise providing the link to the virtual assistant. After act 854 is completed, process 800 completes.

The Applicants have recognized that a network of users constructed from information in their profiles contains a wealth of information that may be used for purposes other than customizing the behavior of virtual assistants. For example, in some embodiments, information in the network of users may be analyzed to derive any knowledge of interest (e.g., the work-home commute time distribution of users working in metropolitan areas in the United States). As another example, in some embodiments, information in the network of users may be analyzed to identify what information users wish to consume and results of the analysis may be provided to another entity. For instance, information in the network of users may be analyzed to identify that at least a threshold percentage of users in the network are interested in news about a particular topic, and this information may be provided (e.g., sold) to a news agency. As another example, information in the network of users may be analyzed to determine that a threshold percentage of users on the east coast have used their weather applications more than three times in the last twenty four hours.

V. Background Agents

Figure 9:
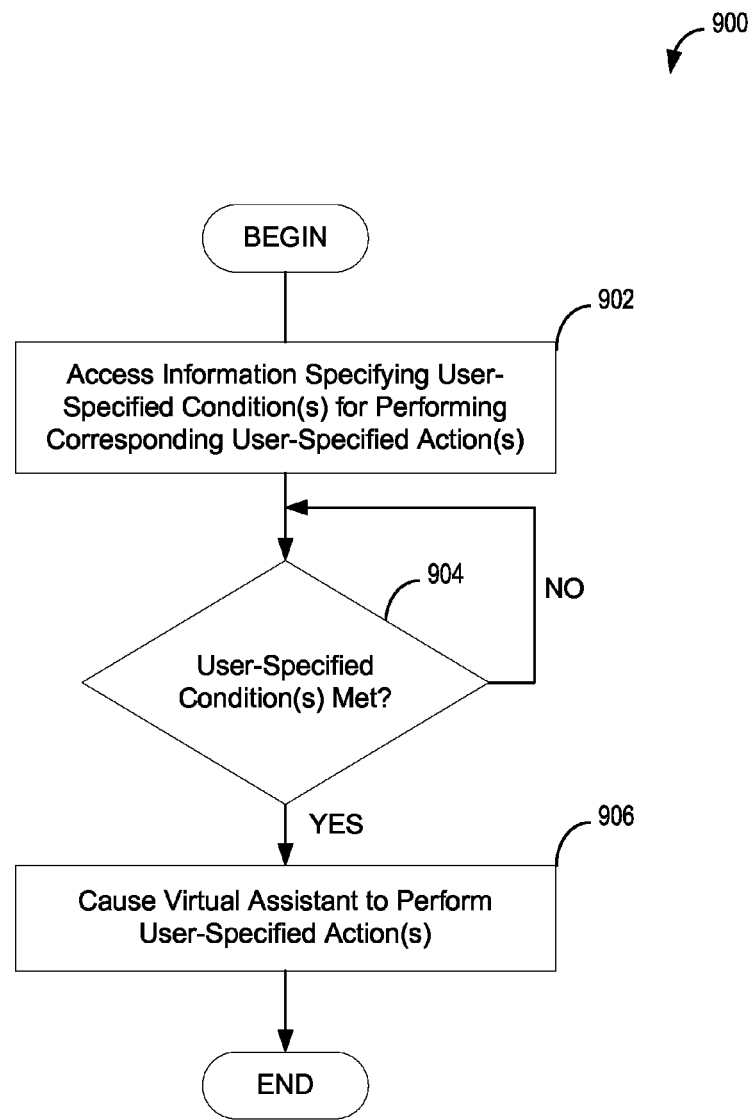
FIG. 9 is a flowchart of an illustrative process for causing a virtual assistant to perform one or more user-specified actions, when it is determined that one or more user-specified conditions corresponding to the user-specified action(s) are met, in accordance with some embodiments of the disclosure provided herein.

As described above, in some embodiments, a virtual assistant may proactively perform one or more actions when interacting with a user based on at least some information in the user's profile and/or on at least some information in the profile(s) of one or more other users associated with the user. Additionally or alternatively, in some embodiments, a virtual assistant may perform one or more user-specified actions when one or more user-specified conditions are met. One such embodiment is illustrated in FIG. 9, which is a flowchart of illustrative process 900 that can be performed on any suitable device (e.g., server 110) configured to communicate with other devices programmed to implement virtual assistants.

Process 900 begins at act 902, where the device executing process 900 accesses information specifying one or more conditions specified by a user and corresponding user-specified actions to be performed by a virtual assistant when the user-specified conditions are met. The information accessed at act 902 may additionally specify which virtual assistants (e.g., a virtual assistant on the user's smart phone, in the user's car, in the user's laptop, etc.) are to perform the user-specified action(s). This information may be accessed from any suitable source. For example, the information specifying user-specified conditions and corresponding user-specified actions may be stored on the device executing process 900 and/or any other devices accessible by the device executing process 900 and may be accessed therefrom.

As one non-limiting example, information accessed at act 902 may specify that when information related to a topic of interest to the user is available, a virtual assistant is to provide the user with the information related to that topic. For example, the user may specify that when a new article about his/her favorite sports team is written, the virtual assistant is to notify the user of the new article and provide the user with a link to the article. As another example, the user may specify that when the user's favorite artist releases a new song, the virtual assistant is to download the song from a suitable source. As another non-limiting example, information accessed at act 902 may specify that when there is a traffic problem on the user's route, a virtual assistant executing on a device in the car the user is driving is to provide the user with information about the traffic problem and propose a new route to the user. As yet another non-limiting example, information accessed at act 902 may specify that when it is determined that user is late for a meeting, a virtual assistant executing on the user's smart phone is to change the background color on the smart phone and/or cause the smart phone to vibrate using a specific pattern of vibration. As yet another non-limiting example, information accessed at act 902 may specify that when the score of a sports game (or the point differential between the teams) changes by a threshold amount, a virtual assistant is to provide the user with an updated score.

In some embodiments, information accessed at act 902 may specify one or more user-specified conditions related to the user's device and one or more corresponding actions. As one non-limiting example, information accessed at act 902 may specify that when a user's mobile device is in the user's car, a virtual assistant executing on the user's mobile device is to establish a connection with the car (e.g., a direct wireless connection). As another non-limiting example, information accessed at act 902 may specify that when a user's mobile device is in airplane mode, a virtual assistant executing on the mobile device is to close all application programs executing on the device that require a network connection. As yet another non-limiting example, information accessed at act 902 may specify that when a user's mobile device is moving by more than an inch per second, a virtual assistant executing on the user's mobile device is to cause the mobile device to flash a light and/or sound an alarm. As yet another non-limiting example, information accessed at act 902 may specify that when a user's mobile device receives a message (e.g., a text message, an e-mail message, etc.) asking about the user's location (e.g., receiving the message "where are you"), a virtual assistant executing on the mobile device automatically sends, to the sender of the message, a response containing information indicative of the location of the mobile device (e.g., GPS coordinates).

It should be appreciated that the above-described examples of user-specified conditions and corresponding user-specified actions are illustrative. Users may specify any other suitable conditions and corresponding actions, as aspects of the disclosure provided herein are not limited in this respect.

A user may specify one or more conditions and one or more corresponding actions in any suitable way. In some embodiments, the user may provide voice input to a virtual assistant with which the user is interacting (or any other suitable application program configured to receive voice input from the user), the voice input specifying at least one condition and at least one corresponding action. The virtual assistant may process the received input to identify the specified condition(s) and corresponding action(s) using automatic speech recognition, natural language understanding, and/or any other suitable techniques. A user may specify one or more conditions and/or actions using one or more logical operators (e.g., AND, OR, XOR, NOT, etc.). As one non-limiting example, the user may specify a condition that when "it is Friday" AND "the weather forecast for Saturday is sunny" AND NOT "Stacy is in town," a virtual assistant is to perform "sending the message, 'let's meet tomorrow' to Lisa AND "reserve a table at the Ritz Carlton restaurant at 6 pm."

After information specifying at least one user-specified condition and at least one corresponding action is accessed at act 902, process 900 proceeds to decision block 904, where a determination is made as to whether the user-specified condition(s) have been met. This may be done in any suitable way. For example, in some embodiments, the device executing process 900 may monitor and/or search one or more sources of information (e.g., one or more news sources, traffic report data sources, stock price sources, social networks, etc.) to determine whether the user-specified condition(s) have been met.

When it is determined that the user-specified condition(s) have not been met, process 900 may return to decision block 904. In this way, the process may continually monitor whether the user-specified condition(s) have been met. The determination may be made repeatedly at any specified time interval, may be triggered by occurrence of an even or in any other suitable way. When it is determined that the user-specified condition(s) have been met, process 900 proceeds to act 906, where the computing device executing process 900 causes a virtual assistant executing on a device of the user to perform one or more user-specified actions corresponding to the user-specified conditions. Though some user-specified actions may be performed by a virtual assistant alone (e.g., generate a voice notification), in some embodiments a user-specified action may be performed at least in part by another application program executing on the device programmed to implement the virtual assistant (e.g., an e-mail application program, a music player, an alarm program, a calendar application program, a web-browser application program, etc.). After act 906 is performed, process 900 completes.

In some embodiments, process 900 may be performed by using multiple software agents. Each software agent may be programmed to determine whether at least one user-specified condition is met and, when the software agent determines that the at least one user-specified condition is met, the software agent may cause a virtual assistant to perform at least one user-specified action corresponding to the user-specified condition(s). Accordingly, in some embodiments, different software agents may be responsible for determining whether different user-specified conditions are met. For example, one software agent may be configured to monitor traffic information to determine whether there is a traffic problem on the user's route and, upon determining that there is a traffic problem on the user's route, cause a virtual assistant executing on a device in the car the user is driving to provide the user with information about the traffic problem. A different software agent may be configured to monitor one or more news sources to determine whether a new article about the user's favorite sports team has been posted and, upon determining that a new article has been posted, cause a virtual assistant on a device of the user to provide the user with a link to the new article.

A software agent may be a program comprising processor-executable instructions that, when executed by at least one processor, cause the at least one processor agent to perform one or more functions. A software agent may be invoked automatically without any user input invoking the software agent. A software agent may execute on a device in the background without interacting with the user of the device. A software agent executing on one device may be "transferred" to another device, whereby the process being performed by a software agent on one device continues to be performed (e.g., by a software agent executing) on the other device. A software agent may send information to and receive information from one or more other software programs (e.g., software agents, virtual assistants, application programs, operating systems, etc.), executing on any suitable device. A software agent may cause one or more other software programs, executing on any suitable device, to perform an action. For example, a software agent executing on one device may cause a virtual assistant executing on the same device or on another device to perform any suitable action, examples of which have been provided with reference to FIG. 9.

In some embodiments, when process 900 is performed by multiple software agents, the software agents may execute on one device (e.g., a server, a device programmed to implement a virtual assistant, etc.) or execute in a distributed manner on multiple devices (e.g., multiple servers, at least one server and at least one device programmed to implement at least one virtual assistant, etc.). Accordingly, in some embodiments, process 900 may be performed on a device programmed to implement at least one virtual assistant (e.g., computing device 104a), on a device (e.g., server 110) configured to communicate with one or more devices programmed to implement at least one virtual assistant, or at least in part on a device programmed to implement at least one virtual assistant and at least in part on a device configured to communicate with one or more devices programmed to implement at least one virtual assistant. In some embodiments, when the software agents execute in a distributed manner on multiple devices, the way in which execution of software agents is distributed among the multiple devices may depend on availability and/or cost of computing resources associated with the devices. For example, the way in which execution of software agents is distributed among multiple device may depend on available computing power on one or more of the devices, available memory on one or more the devices, network connectivity of one or more of the devices, cost of connecting to a network by one or more of the devices (e.g., whether the connection is cheap such as wireless LAN connection at home or expensive such as a cellular phone connection in a foreign country), whether one or more of the devices is battery-powered or connected to a power supply, and etc.

In some embodiments, after a virtual assistant performs an action (e.g., as part of act 906 of process 900 or in any other suitable context), the user may engage the virtual assistant in a dialogue related to the action. The user may engage the virtual assistant in a dialogue by providing voice input (e.g., natural language input) to the virtual assistant, by typing input, and/or providing input in any other suitable way. The virtual assistant may process the input using ASR, NLU, and/or any other suitable types of speech processing techniques. In some embodiments, the virtual assistant may use one or more topic-dependent language models to recognize the user's spoken input. As one non-limiting example, in response to a virtual assistant presenting information to the user (e.g., a notification that the New England Patriots beat the New York Giants in the Superbowl by a lopsided score), the user may request the virtual assistant to provide the user with additional information by asking the virtual assistant a follow-up question related to the presented information (e.g., "How many touchdowns did Tim Tebow throw?"). The virtual assistant may recognize the received voice input using a topic-dependent language model for recognizing speech input relating to sports and/or any other suitable language model.

In the above-described embodiments, conditions and corresponding actions to be performed by a virtual assistant are specified by a user. However, aspects of the disclosure provide herein are not limited to having conditions and corresponding actions be specified by a user. In other embodiments, conditions and corresponding actions may be specified automatically based on information in the user's profile. As one non-limiting example, information in the user's profile may be analyzed to identify a topic of interest to the user (e.g., Botswana politics) and a condition-action pair may be specified to indicate that when information related to the identified topic of interest to the user is available (e.g., a news article about Botswana elections is published), a virtual assistant is to provide the user with the information related to that topic (e.g., a link to the new article). As a specific non-limiting example, information in the user's profile may be analyzed to identify that the user has contacts in the Ohio region and a condition-action pair may be specified to indicate that when information about the Ohio region becomes available (e.g., a tornado hit the Dayton, Ohio area), a virtual assistant is to provide the user with that information (e.g., a link to a news article, a notification, etc.). As another specific non-limiting example, information in the user's profile may be analyzed to determine that the user likes the band Black Sabbath (e.g., the user has listened to many Black Sabbath songs) and a condition-action pair may be specified to indicate that, when information about Ozzy Osbourne appears in the news, a virtual assistant is to provide this information to the user.

It should be appreciated that information in the user's profile, including information that may be analyzed to automatically specify conditions and corresponding actions, may be specified by the user (e.g., the user explicitly specifies a news topic of interest), automatically identified from action(s) performed by the user (e.g., when the user repeatedly looks up information about a news topic, the system infers that this news topic is of interest to the user and stores that information in the user's profile), and/or automatically identified in any other suitable way.

Conditions and corresponding actions may be specified automatically by any suitable software executing on any suitable device having access to the user's profile, examples of which are provided herein. A condition and a corresponding action may be specified automatically in any suitable way. For example, a condition and corresponding action may be specified by creating a software agent configured to determine whether the condition has been met and to cause a virtual assistant to perform the corresponding action when the condition is met. Alternatively, a condition and a corresponding action may be specified automatically in any other suitable way (e.g., storing data reflecting the condition/act pair), as aspects of the disclosure provided herein are not limited in this respect.

VI. Conducting Call with Interactive Voice Response System using a Virtual Assistant As described above, some embodiments provide for using a virtual assistant executing on the caller's device to conduct a call between an IVR system and the caller. The virtual assistant may conduct the call by influencing the style in which information provided to the caller during the call and/or the content of information passed between the IVR and the device used by the caller to conduct the call. In some embodiments, the virtual assistant may access at least some information in the caller's profile and conduct the call by influencing, based on the accessed information, the style in which information provided to the caller during the call and/or the content of information passed between the IVR and the device used by the caller to conduct the call.

Figure 10:
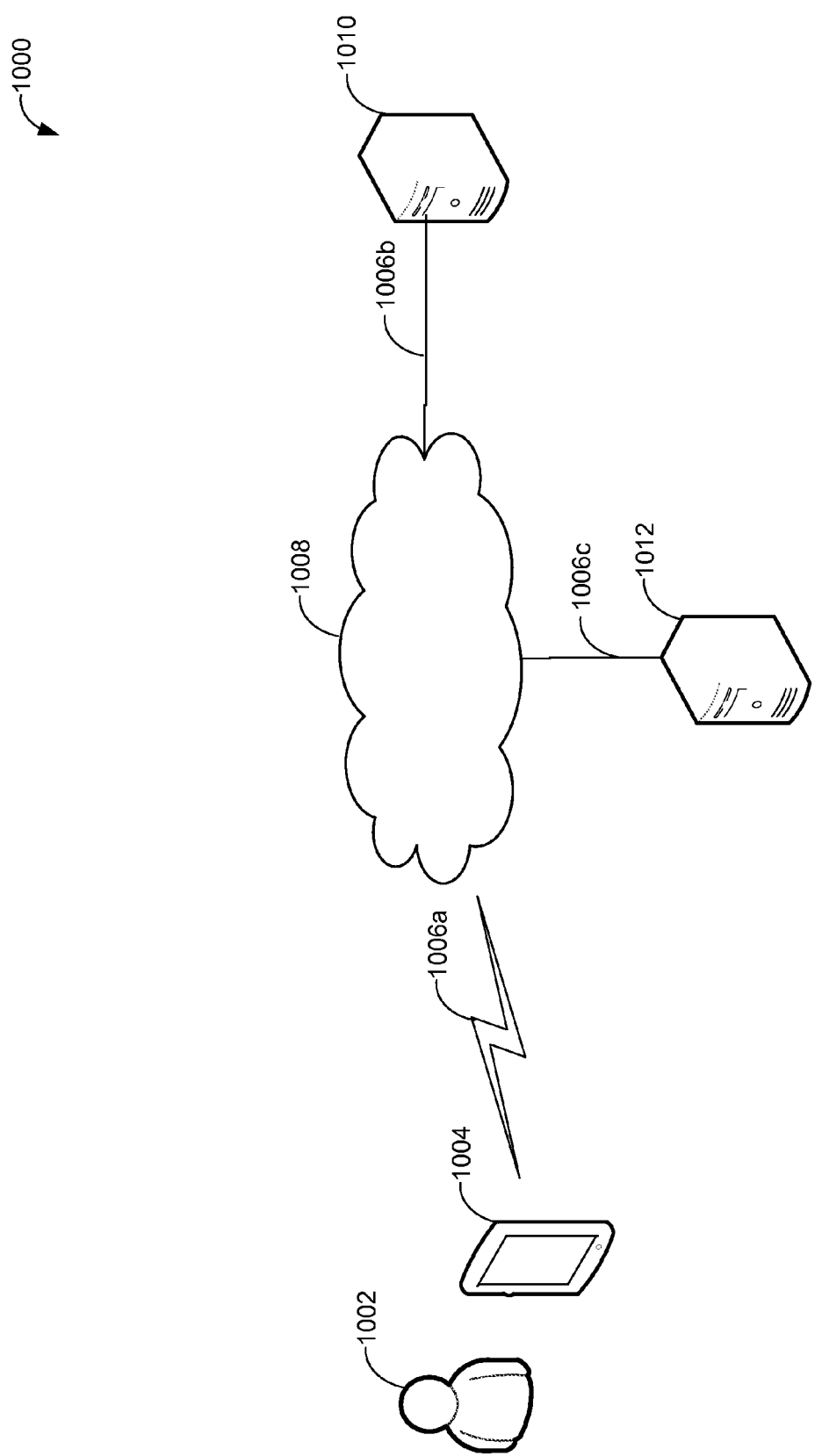
FIG. 10 shows another illustrative environment in which some embodiments of the disclosure provided herein may operate.
Figure 11B:
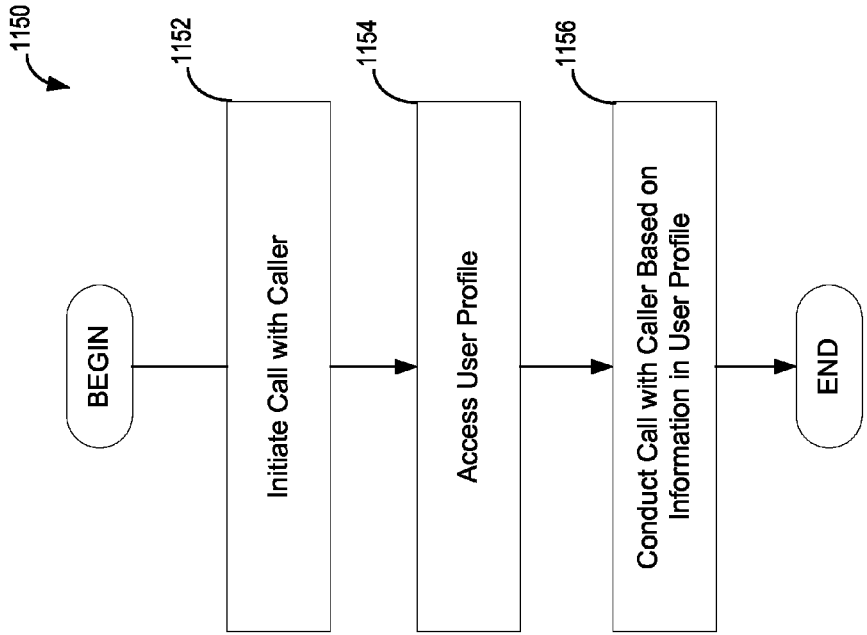
FIG. 11B is a flowchart of an illustrative process for conducting a call between a caller and an interactive voice response system based on information in the caller's profile, in accordance with some embodiments of the disclosure provided herein.

FIG. 10 shows an illustrative non-limiting environment 1000 in which some embodiments of the disclosure related to conducting a call between a caller and an IVR system may operate.

In environment 1000, caller 1002 may use any suitable device 1004 to conduct a call with IVR system 1010. In one embodiment, device 1004 may be any suitable mobile device that caller 1002 may use to communicate with IVR system 1010. For instance, device 1004 may be a dedicated mobile phone (e.g., a cellular phone), a mobile smart phone, a PDA, a laptop computer, a tablet computer, or any other mobile device capable of supporting a call through a communications medium (e.g., a wired or wireless communications medium). In other embodiments, caller 1002 is not limited to making a call by using a mobile device and may use any device capable of supporting a call. For instance, caller 1002 may communicate with IVR system 1010 by using a telephone connected to a landline, a desktop computer connected to a network such as the Internet, or using any other device capable of communicating with IVR system 1010.

In some embodiments, device 1004 may be programmed to implement at least one virtual assistant in accordance with embodiments described herein. A virtual assistant implemented on device 1004 may be configured to conduct the call between caller 1002 and IVR system based on at least some information in the caller's profile (e.g., user profile 200 described with reference to FIG. 2). The caller's profile may be stored locally on device 1004 and/or remotely on server 1012 to which device 1004 is connected via communication medium 1008, and the virtual assistant executing on device 1004 may be configured to access the locally and/or remotely stored copies of the caller's profile. Server 1012 may be any suitable type of server and, for example, may be server 110 described with reference to FIG. 1A. Sever 1012 may be one or multiple servers. In the illustrated environment 1000, device 1004 is shown as connected to IVR system and server 1012 using the same communication medium. However, in other embodiments, device 1004 may be connected to IVR system 1010 and server 1012 using different communication mediums (e.g., using the Internet to connect to server 1012 and a cellular telephone network to connect to IVR system 1010). In some embodiments, a virtual assistant may execute on device 1004, on server 1012, or partially on device 1004 and partially on server 1012 (e.g., a virtual assistant may execute at least partially on server 1012 by using server-side dialog management functionality).

In some embodiments, IVR system 1010 may conduct a call with caller 1002 based on at least some information in the caller's profile. IVR system 1010 may be configured access at least some information in the caller's profile stored on caller's device 1004 and/or server 1012.

A call may be any suitable type of communication that supports voice communications. A call may enable a caller to communicate by allowing the caller to provide acoustic input and/or receive acoustic output. A call is not limited by the type of communications infrastructure or communications medium used to support the call. For example, a call may be a telephone call supported by using a public-switched telephone network, a wireless cellular network, or other telephone network. As another example, the call may be a VoIP call supported by a public (e.g., Internet) or private (e.g., corporate Intranet) network configured to support the Internet Protocol, or any other type of call.

In some embodiments, a call between a caller 1002 and an IVR system 1010 may be managed by the virtual assistant (executing on the caller's device 1004 and/or server 1012), by the IVR system 1010, or partially by the virtual assistant and partially by the IVR system 1010. For example, the virtual assistant (executing on the caller's device 1004 and/or server 1012) may perform dialog management functionality during the call. As another example, the IVR system 1010 may perform dialog management functionality during the call. As yet another example, dialog management may be performed partially by the virtual assistant and partially by the IVR system. As one non-limiting example, the virtual assistant may manage dialog related to performing simple tasks such as data entry (e.g., entering an address) and the IVR system may manage other aspects of the dialog during the call between the IVR system and the caller.

In the illustrated environment 1000, device 1004 communicates with IVR system 1010 through a communication medium 1008. Communication medium 1008 may be any suitable network or other type of communication medium. For example, communication medium 1008 may be a cellular network, a local area network, a circuit-switched telephone network, a public-switched telephone network, the Internet, some combination of any of the foregoing, or any other communication medium capable of supporting telecommunications.

In the illustrated environment 1000, device 1004 is communicatively coupled to communication medium 1008 via wireless connection 1006a, IVR system 1010 is communicatively coupled to communication medium 1008 using a wired connection 1006b, and server 1012 is communicatively coupled to communication medium 1008 via wired connection 1006c. This is merely for illustration, as device 1004, IVR system 1010, and server 1012 each may be communicatively coupled to communication medium 1008 in any suitable way, including wired and/or wireless connections.

IVR system 1010 comprises one or more computers (e.g., servers) each configured to perform processing related to supporting the functionality of the IVR system. In the illustrated embodiment, IVR system 1010 comprises a single server, though in other embodiments any suitable number of servers may be used and distributed in any manner. For instance, in some embodiments, IVR system 1010 may comprise at least ten, at least one hundred, or at least one thousand servers. For embodiments in which the IVR system comprises multiple servers, the servers need not be located in the same physical location and may be distributed across multiple physical locations. Each server may be configured (alone or in combination with one or more other servers) to support one or more IVR applications and may be configured to execute any other programs. For example, one or more of the servers may be configured to execute programs for supporting functionality related to call management, dialog management, speech recognition, text-to-speech synthesis, and/or any other functions used by an IVR system.

Figure 11A:
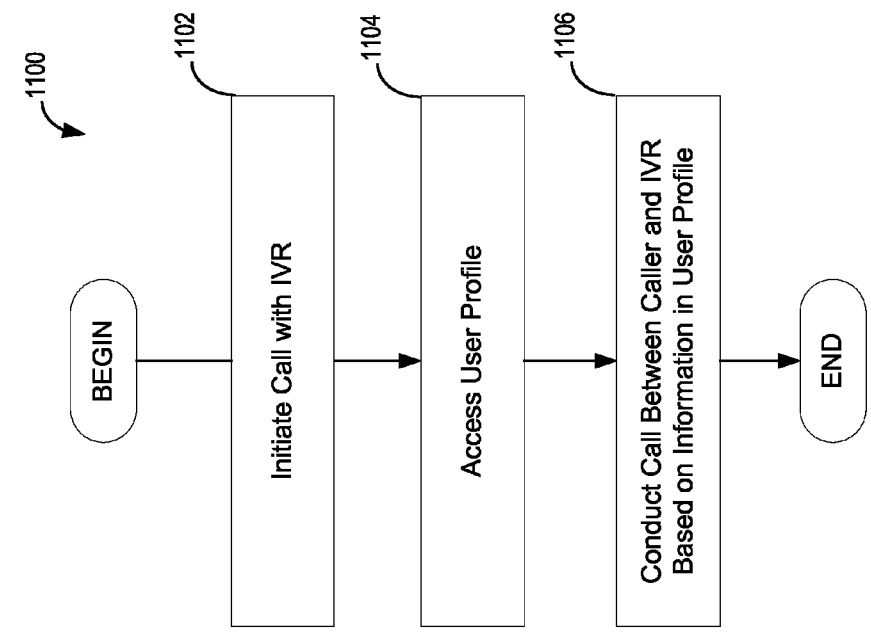
FIG. 11A is a flowchart of an illustrative process for conducting a call between a caller and an interactive voice response system by using a virtual assistant, in accordance with some embodiments of the disclosure provided herein.

One embodiment for conducting a call between a caller and an IVR system by using a virtual assistant is shown FIG. 11A, which is a flowchart of illustrative process 1100 that may be performed by any device (e.g., device 1004) capable of conducting a call with an IVR system and programmed to implement at least one virtual assistant.

Process 1100 begins at act 1102, where a call is initiated between a caller and an IVR system. The caller is using the device executing process 1100 to conduct the call. The call between the caller and the IVR system may be initiated in any suitable way. The caller may initiate a call to the IVR system using a virtual assistant executing on the device. Alternatively, the caller may initiate the call using another application program (e.g., a telephone application program, a voice-over IP enabled program, etc.). The IVR system may initiate a call to the caller, or the call may be initiated for the caller by another party such as by another IVR system or by a customer call representative.

When the call was initiated by the virtual assistant at act 1102, the virtual assistant may conduct the call by obtaining information from the caller (e.g., the caller may provide information via natural language input and/or any other suitable type of input) and providing the obtained information to the IVR system, and by receiving information from the IVR system and providing the received information to the caller (e.g., by generating speech, by generating text, via a graphical user interface, and/or in any other suitable way).

When the call was not initiated by using the virtual assistant, then after the call is initiated, the call may be handed over to the virtual assistant and the virtual assistant may conduct the call in any of the above-described ways. The call may be handed over to the virtual assistant in any suitable way. As one non-limiting example, the IVR system may determine that the device being used by the caller to conduct the call is programmed to implement a virtual assistant and may request that the device transfer handling of the call to the virtual assistant. As another non-limiting example, the application program used to initiate the call may prompt the caller to ask him/her whether he/she would like the call to be handled by a virtual assistant on the device. As yet another non-limiting example, the virtual assistant may be executing in the background and may detect that a call between the caller and an IVR has been established and either prompt the caller to ask him/her whether he/she would like the call be handled by the virtual assistant or alternatively take over handling of the call.

Next, process 1100 proceeds to act 1104, where the virtual assistant accesses at least some information the caller's profile. The virtual assistant may access a copy of the caller's profile from any suitable source (e.g., on the device executing process 1100, on a remote server via a network connection, on a portable device via a direct wireless connection, etc.) and in any suitable way, including any of the ways described herein (e.g., with reference to FIGS. 1A and 1B).

Next, process 1100 proceeds to act 1106, where the virtual assistant conducts the call with the IVR system based at least in part on the accessed information. This may be done in any suitable way. For example, in some embodiments, the virtual assistant may access information in the caller's profile specifying a virtual assistant persona and the virtual assistant may adopt the virtual assistant persona when providing information received from the IVR to the caller. For instance, the virtual assistant may generate speech in accordance with voice font and/or speaking style associated with the adopted virtual assistant persona, when providing information received from the IVR to the caller. As another example, the virtual assistant may generate text in accordance with a text style associated with the adopted virtual assistant persona, when providing information received from the IVR to the caller. In this way, information obtained from the IVR may be provided to the caller in a personalized manner.

In some embodiments, the virtual assistant may access information in the caller's profile identifying music (e.g., one or more songs, a music artist, type of music, etc.) the caller enjoys listening to. When the IVR system wishes to play music to the caller (e.g., when the caller is on hold), the virtual assistant system may play at least some of the music identified in the caller's profile as music the caller enjoys listening to rather than the music output by the IVR system.

In some embodiments, the virtual assistant may identify information desired by the IVR system (e.g., the caller's name, the caller's address, an account number, the caller's date of birth, the caller's schedule, etc.) and determine whether it may provide such information to the IVR system. When the virtual assistant determines that it may provide information desired by the IVR system to the IVR system, the virtual assistant may access this information (e.g., in the caller's profile) and provide it to the IVR system. This may be done with or without any input from the caller. As one non-limiting illustrative example, the caller may initiate a call with an IVR system of an electric company to schedule an appointment for an electrician to come to the caller's residence. The caller's virtual assistant may access the caller's schedule in the caller's profile and schedule an appointment with the electrician based at least in part on the caller's schedule. When the virtual assistant determines that it is not permitted to provide information desired by the IVR system to the IVR system (and/or when the virtual assistant determines that the caller's profile does not include the information desired by the IVR system), the virtual assistant may prompt the caller for permission to provide the desired information from the caller's profile to the IVR system (and/or to provide the desired information).

In some embodiments, the caller's profile may store data related to one or more prior calls between the caller and the IVR system and the virtual assistant may conduct the call between the caller and the IVR system based, at least in part, on these data. For example, the caller may have requested to access a service (e.g., track a package, check an account balance, check the status of an airline flight, etc.) during one or more prior calls with the IVR system and may have identified one or more subjects of the service (e.g., which package to track, which bank account balance to report, which flight status to check, etc.). The virtual assistant may prompt the caller to determine whether the caller is calling the IVR system to request the same service and provide information identifying the service (e.g., tracking a package) and a subject of the service (e.g., tracking number identifying the package to track) to the IVR system without prompting the caller to re-enter this information.

In some embodiments, the caller's profile may store information associated with the IVR system and the virtual assistant may conduct the call between the caller and the IVR system based, at least in part, on this information. Information associated with the IVR system may comprise information written in the caller's profile by the IVR system or on behalf of the IVR system (e.g., in a section of the caller's profile registered to the IVR system). As one non-limiting example, information associated with the IVR system may include any suitable information in the IVR's database about the caller (e.g., the caller's payment history, the caller's calling history, information provided by the caller to the IVR during one or more prior calls, information provided by the IVR to the caller during one or more prior calls, information obtained by the IVR about the caller from a third-party source, etc.). In some embodiments, information associated with the IVR system may be stored at one location (e.g., server 1010) different from another location (e.g., server 1012) where other information in the caller's profile is stored. The portions of the caller's profile may be linked by references. For example, the portion of the caller's profile stored on server 1012 may store a reference (e.g., a link) to the portion of the callers profile stored on server 1010.

As described above, in some embodiments, the device used by a caller to conduct a call may access information in the caller's profile and the virtual assistant executing on the device may use this information to conduct a call between the caller and the IVR system. However, a virtual assistant is not limited to using information only in a caller's profile to conduct the call between the caller and the IVR system and may use any other suitable information in addition to or instead of information in the caller's profile to conduct the call, as aspects of the disclosure provided herein are not limited in this respect.

In other embodiments, an IVR system may access at least some information in the caller's profile and conduct the call with the caller based on the accessed information. One such embodiment is described with reference to FIG. 11B, which shows a flowchart of illustrative process 1150 performed by an IVR system (e.g., IVR system 1010 described with reference to FIG. 10).

Process 1150 begins at act 1152, where a call between the IVR system and a caller is initiated. The call may be initiated in any suitable way, examples of which have been described with reference to process 1100. Next, process 1150 proceeds to act 1154, where the IVR system requests access to at least some information in the caller's profile. The IVR system may request to access a copy of the caller's profile from any suitable source (e.g., the device used by the caller to conduct the call with the IVR system, a remote server (e.g., server 1012) etc.). In some embodiments, access to the information in the caller's profile may be provided to the IVR system when the caller's profile indicates that at least some information in the profile may be accessed by the IVR system.

Next, process 1150 proceeds to act 1156, where the IVR system conducts the call with the caller based on at least on some information in the caller's profile. After the call ends, process 1150 completes. The IVR system may conduct the call with the caller based on information in the caller's profile in any suitable way. For example, in some embodiments, the IVR system may access information in the caller's profile specifying a virtual assistant persona and may customize the way it presents acoustic output to the caller by generating speech in accordance with the voice font and/or speaking style associated with the virtual assistant persona. In this way, the IVR may "talk" to the caller with a voice customized to the caller's preferences.

In some embodiments, the IVR system may access information in the caller's profile identifying music (e.g., one or more songs, a music artist, type of music, etc.) the caller enjoys listening to. When the IVR system plays music to the caller (e.g., when the caller is on hold), the IVR system may play at least some of the music identified in the caller's profile as music the caller enjoys listening to.

In some embodiments, the IVR system may access, in the caller's profile, at least some information that the IVR system desires to collect from the caller (e.g., the caller's name, the caller's address, an account number, the caller's date of birth, the caller's schedule, etc.). When the IVR system is able to access information it desires in the caller's profile, the IVR system may use this information without any input from the user or may prompt the user to confirm whether the accessed information is correct (e.g., the IVR system may ask "Is your mailing address still 55 Peach Tree Lane?").

In the above-described embodiments, an IVR system may customize the voice and/or music it outputs to a caller based on information stored in the caller's profile. Additionally or alternatively, the IVR system may customize the voice and/or music it outputs to the caller based on information obtained from a service that obtains voice and/or music preferences from people and makes the obtained information available (e.g., for a fee) to any IVR system registered with the service.

Accordingly, in some embodiments, a service may obtain voice and/or music preferences from any suitable number of users in any suitable way and provide at least some of the obtained information to an IVR system. A user may access the service (e.g., via a website, via an application program executing on the person's mobile device, etc.) and provide the service with information specifying the user's voice and/or music preferences. A user may provide information specifying his/her music preferences by providing natural language input (e.g., by speaking "I really like the Beatles"), by selecting one or more music options provided to the user by the service (e.g., selecting one or more songs in a list of songs shown to the user via a webpage), and/or in any other suitable way.

A user may provide information specifying his/her voice preferences in any suitable way, for example by selecting one or more voices from a set of TTS voices provided to the user by the service. In some embodiments, the service may present a user with a list of one or more TTS voices (e.g., "female voice with British accent," "male voice with British accent," "female child's voice," "voice of Johnny Depp," "voice of Angelina Jolie," "voice of Roger Rabbit," etc.) and the user may select one of the voices on the list. To help the user select a TTS voice from the list, the service may allow the user to listen to samples of speech generated in accordance with one or more of the TTS voices. The service may also allow the user to customize one or more of the TTS voices on the list (e.g., by allowing the user to set/vary any suitable voice parameters including pitch, speaking rate, etc.). In some embodiments, the service may allow the user to create a TTS voice to sound like the user's own voice at least in part by analyzing voice input provided by the user and using results of the analysis to create a TTS voice that sounds like the user's voice.

VII. Personalized Tour Guide

In some embodiments, a virtual assistant interacting with a user may act as a tour guide for the user. The virtual assistant may create a tour encompassing one or more locations, guide the user from one location on the tour to the next, provide the user with information about the locations on the tour, and/or perform any other suitable actions to aid the user in touring the locations on the tour. The virtual assistant may perform some or all of these actions based on at least some information in the user's profile. For example, the user's profile may include information specifying the user's interests and the virtual assistant may create a tour tailored to those interests (e.g., by including locations of interest to the user in the tour), provide the user with information on the tour tailored to her interests, etc. In this way, the virtual assistant may act as a personalized tour guide for the user.

In some embodiments, a user may provide input to the virtual assistant requesting that the virtual assistant create a personalized tour. The user may request a personalized tour of an area (e.g., a city, a town, a neighborhood, a region, etc.), at least one location (e.g., a museum, a landmark, a castle,), and/or of anything that may be toured. The user may request that the tour last a specific amount of time (e.g., a one-day tour, a three-hour tour, a one-week driving tour, etc.). The user may request that the tour include specific locations in an area (e.g., "create a tour of Boston including Fenway Park"). Additionally or alternatively, the user may provide any other suitable information when requesting a tour, as aspects of the disclosure provided herein are not limited in this respect.

In response to receiving the user's request to create a personalized tour, the virtual assistant may create the tour based at least in part on information in the request. In some embodiments, the virtual assistant may create the tour based on at least some information in the user's profile. For example, when a user requests a tour of Boston and the user's profile specifies that the user's interest includes reading and Thai food, the virtual assistant may include a bookstore and a lunch stop at a Thai restaurant in the personalized tour.

The virtual assistant may create a tour by selecting one or more locations to include on the tour and an order in which to visit them. The virtual assistant may create the tour based on information in the user's request to create a tour and information in the user's profile. This may be done in any suitable way. As one non-limiting example, the virtual assistant may create a tour by accessing information (e.g., obtained from a geographic information system, a map provider, etc.) that includes a collection of potential locations to include on a tour and selecting one or more of the potential locations to include on the tour based on information in the user's profile (e.g., select at least one bookstore when the user's profile indicates that the user enjoys reading). As another non-limiting example, the virtual assistant may create a tour by selecting a number of locations to include in the tour so that the length of the tour is what the user requested (e.g., approximately five hours).

After a personalized tour is created, the virtual assistant may allow the user to edit/change the tour (e.g., by removing a particular location from the tour, changing the order in which locations are visited, etc.). Information specifying the tour may be used to conduct the tour and/or saved to conduct the tour at a later time.

The virtual assistant may guide the user on the created tour. The virtual assistant may use global positioning system (GPS) information to provide the user directions to go from one location on the tour to another. At each location on the tour, the virtual assistant may provide the user with information about that location (the virtual assistant may obtain information about a location from any suitable source). The virtual assistant may answer the user's questions about a location on the tour and/or the tour itself (e.g., "when was this church built," "how long until the Thai restaurant," etc.).

In some embodiments, the virtual assistant may use information specifying the position and/or orientation of the device (e.g., a smart phone) on which it is executing to identify the object (e.g., building, a statue, etc.) the device is pointed at, and provide the user with information about the object. In some embodiments, the virtual assistant may cause the device to display an image of what the device is pointed at. The image may be overlaid on other information displayed by the device (e.g., a map of the tour, an augmented reality image of a location on the tour, etc.). In some embodiments, the device may be configured to receive input from the user and/or present output to the user via one or more auxiliary devices. For example, the device may be configured to receive audio input and present audio output via a headset connected to the device. As yet another example, the device may be configured to visually display information to the user via smart glasses (e.g., to present information about an object that the user's device is pointed, such as a building, in the user's field of vision).

Although in some embodiments, a virtual assistant may implement the functionality of a personalized tour guide, aspects of the disclosure provided herein are not limited in this respect. In some embodiments, a personalized tour guide may be implemented not as a virtual assistant, but as a stand-alone application program, a web-based service, or in any other suitable way.

VIII. Task Macros

The Applicants have recognized that a user may wish to use a computing device (e.g., mobile device, desktop computer, etc.) to perform a task comprising multiple different sub-tasks, but that using the device to perform multiple different sub-tasks may require the user to use multiple application programs on the device, which is time-consuming, especially when the task is to be performed repeatedly.

As one non-limiting example, the user may wish to perform the task of organizing a dinner at a restaurant with his/her friends. This task may involve performing multiple sub-tasks including: identifying times when everyone is available (e.g., using a calendar application program), identifying restaurants which have availability to seat the entire party at any of the times that everyone is available (e.g., using a restaurant reservation application program), and sending e-mail invitations to each of the friends listing the options for dinner (e.g., using an e-mail application program). In this example, the user may need to use at least three different application programs (e.g., a calendar application program, a restaurant reservation application program, and an e-mail application program) to perform the task, which is time consuming, especially if the user performs this task repeatedly.

The Applicants have appreciated that an improved user experience may be provided if the performance of a task comprising multiple sub-tasks were at least partially automated. Accordingly, some embodiments provide for at least partially automating performance of a task comprising multiple sub-tasks by creating a task macroinstruction (a task macro, for short), which is a software program comprising processor-executable instructions that, when executed, at least partially automate the performance of the task. The task macro may be associated with a command (e.g., a voice command, a button press, etc.) and the user may invoke the task macro by using the command (e.g., speaking the voice command, pressing the button, etc.).

In some embodiments, a task macro may at least partially automate the performance of a task comprising a sequence of multiple sub-tasks by guiding the user through the sequence of sub-tasks so that the user need not explicitly initiate the performance of each sub-task in the sequence. In this way, the task macro encodes a workflow for performing the task. The task macro may automatically provide one or more inputs needed for performing one or more of the sub-tasks. Continuing the above-described example, a task macro for organizing a dinner with friends may initially present the user interface of the calendar application to the user and, when the user indicates that the user is ready to go on to the next sub-task (e.g., by pressing a "next" button or in any other suitable way), the task macro may automatically present the user interface of the restaurant reservation application to the user and, when the user indicates that the user is ready to go on to the next sub-task, the task macro may automatically present the user interface of the e-mail application to the user and show the user a draft e-mail pre-populated with the user's friend's e-mail addresses and draft text for inviting them to dinner at one of the identified restaurants.

A task macro may interact (via calls to the API of the application program) with one or more other application programs used for performing each of one or more sub-tasks. For example, the task macro for organizing a dinner with friends may provide input to an application program for performing one sub-task (e.g., provide a name of a restaurant to the e-mail application program for creating a draft e-mail inviting the user's friends to the restaurant) based on information obtained from another application program used to perform another sub-task (e.g., a restaurant reservation program used to identify a restaurant with availability). In some embodiments, a task macro may be implemented by one or multiple software agents, which are described herein.

In some embodiments, a task macro may access at least some information about the user and/or one or more other users. For example, a task macro may access at least some information in the profile of the user and/or in the profile(s) of one or more other users in any of the ways described herein. For example, a task macro may access information about the schedules of the people the user wishes to invite to dinner in their user profiles.

A task macro may be created in any suitable way. In some embodiments, a user may "record" a macro by providing an indication to a macro creation application program that the user wishes to create a task macro and the macro creation application program creates the task macro at least in part by monitoring and logging the user's subsequent actions, until the user provides an indication that the user has completed creating the task macro. For example, the macro creation application program may monitor and log which application programs the user is using, what order the user is using them in, and/or what inputs the user is providing to each of the application programs, and create a task macro based at least in part on this information. In other embodiments, a user may create a macro by using a graphical user interface of a macro creation application program to specify a sequence of application programs to be used to perform the task and/or the parameters the user is to provide to each of one or more of the application programs. After the user completes creating a task macro, the macro creation application program may store the task macro and associate it with a command (which the user may specify) that may be used to invoke the task macro at a later time (e.g., by providing a spoken command to a virtual assistant executing on the device or in any other suitable way).

IX. Ontology-Based Processing

In some embodiments, a virtual assistant may interact with a user based at least in part on information obtained from one or more ontologies. An ontology may be a knowledge representation that encodes concepts in the world (e.g., objects, locations, categories of objects, and/or any other suitable concepts) and relationships among these concepts (e.g., hierarchical or any other suitable types of relationships). As one non-limiting example, an ontology may encode the concept "Luigi's," a name of a particular Italian restaurant, the concept "Italian restaurant," the concept "restaurant," and the concept "location." The ontology may further encode relationships among these concepts by encoding information indicating that "Luigi's" is a type of "Italian restaurant," that "Italian restaurant" is a type of "restaurant," and that "restaurant" is a type of "location."

An ontology may comprise information identifying one or more actions associated with one or more concepts in the ontology. As one non-limiting example, an ontology encoding the concept "restaurant" may comprise information identifying that the actions of navigating to a "restaurant" and making a reservation at the "restaurant" are associated with the concept "restaurant." As another non-limiting example, an ontology comprising the concept "flight" may comprise information specifying that the actions of checking the status of a "flight," and booking the "flight" are associated with the concept "flight." The above examples are merely illustrative, as a concept in an ontology may be associated with any suitable action(s).

A virtual assistant may interact with the user at least in part by using information obtained from one or more ontologies in any of numerous ways. As one non-limiting example, after a user provides input that includes a concept in an ontology, the virtual assistant may help the user perform one or more actions identified in the ontology as being associated with the concept. For instance, the virtual assistant may receive input "Tell me about Luigi's" from the user, may access information in an ontology containing the concept "Luigi's," and determine, based on information in the ontology, that "Luigi's" is a type of restaurant and, as such, the actions of making a reservation and navigating are associated with "Luigi's." Accordingly, the virtual assistant may help the user make a reservation at Luigi's (e.g., by asking the user "Do you wish to make a reservation at Luigi's," launching a restaurant reservation application, etc.), navigate to Luigi's (e.g., by asking the user "Should I tell you how to get there," displaying the location of Luigi's on a map, etc.), and/or help the user perform any other suitable actions indicated by the ontology as being associated with the concept "Luigi's." As another non-limiting example, the virtual assistant may use one or more NLU techniques to analyze user input (e.g., recognized speech, typed input, etc.) and the NLU technique(s) may use information obtained from an ontology to perform the analysis. For instance, the NLU technique(s) may analyze user input to determine an action intended by the user based on information obtained from the ontology. As a specific example, a user may provide input "Take me to Luigi's," and the virtual assistant may determine, based on information in the ontology indicating that Luigi's is an Italian restaurant to which one may navigate, that the user wishes to drive to an Italian restaurant named Luigi's and may help the user to navigate to the restaurant.

A virtual assistant may access ontology information in any suitable way. In some embodiments, ontology information may be stored remotely from the device on which the virtual assistant is executing (e.g., on one or more servers storing ontology information) and the virtual assistant may access the information by communicating with the device(s) (e.g., via a network) storing the ontology information. However, it may be time-consuming for a virtual assistant to access information about one or more concepts in an ontology every time a user references the concept(s). Accordingly, in some embodiments, at least some ontology information may be stored in the user's profile and the virtual assistant may access ontology information in the user's profile. For example, at least some ontology information may be stored in a locally stored copy of the user profile stored on a device executing the virtual assistant and/or in a remotely stored copy of the user profile stored on one or more computing devices, such as server 110, with which the device executing the virtual assistant may communicate. It should be appreciated that ontology information stored remotely from the device on which the virtual assistant is executing may be stored on the same device(s) that store user profile information (e.g., server 110) or on different device(s).

Any suitable ontology information may be stored in a user's profile. In some embodiments, a virtual assistant may access ontology information stored remotely on one or more servers storing ontology information and store the accessed information in the user's profile. As one non-limiting example, the user may provide input referencing a concept (e.g., Luigi's) and the virtual assistant may access information about the referenced concept in a remotely stored ontology (e.g., information specifying what other concepts are related to the concept "Luigi's," what actions are associated with the concept "Luigi's," etc.) and may store the accessed information in the user's profile. In this way, when a user repeatedly references a concept, a virtual assistant need not repeatedly access remote ontology information about the referenced concept and may utilize the ontology information stored in the user's profile. Ontology information may be stored in the user's profile in any suitable way (e.g., strings, key-value, pairs, etc.), as aspects of the disclosure provided herein are not limited in this respect.

In some embodiments, ontology information stored in a user's profile and/or ontology information stored remotely (e.g., on one or more servers storing ontology information) may change such that ontology information stored in the user's profile is no longer synchronized with remotely-stored ontology information. An ontology may be modified in any suitable way including by removing concepts in the ontology, adding new concepts to the ontology, associating and/or disassociating concepts in the ontology, etc.

In some instances, ontology information stored remotely may be modified in support of processing related to automatic speech recognition, natural language understanding, dialog management and/or any tasks performed at least in part by using one or more servers at least in part by using ontology information. As a specific non-limiting example, an ontology may be updated by replacing the concept "Italian Restaurant" with the concepts "Northern Italian Restaurant," "Southern Italian Restaurant," and "Pizzeria." As yet another specific non-limiting example, a new concept "Ristorante Mario" may be added to the ontology and the ontology may be updated to encode information indicating that Ristorante Mario is a type of "Italian Restaurant."

In some instances, ontology information stored in the user's profile may be modified. For example, one or more third party applications may be configured to access ontology information stored in the user's profile (e.g., a navigation system application may access ontology information in the user's profile to see what the user's favorite restaurant is) and may update this ontology information. Such third-party applications (e.g., a hotel application) may add one or more concepts to the ontology (e.g., a hotel application may add the concept "hotel" to the ontology together with information indicating that "hotel" is a type of location").

Accordingly, in some embodiments, when a determination is made that ontology information in a user's profile is not synchronized with ontology information stored remotely (e.g., on one or more servers storing ontology information), the ontologies may be synchronized so that ontology information in a user's profile is either the same as or a subset of remotely-stored ontology information. The synchronization may occur at any suitable time and in any suitable manner, as aspects of the disclosure provided herein are not limited in this respect. In some embodiments, the synchronization may be performed by one or more servers (e.g., a central ontology server). In some embodiments, performing the synchronization may comprise determining whether the synchronization can be performed automatically and, when it is determined that the synchronization can be performed automatically, synchronizing ontology information in the profiles of one or more users with remotely-stored ontology information. On the other hand, when it is determined that the synchronization cannot be automatically performed, at least some portions of ontology information stored in the profiles of one or more users and not synchronized with remotely-stored ontology information may be deactivated (e.g., deleted, marked unusable, etc.). In this way, a virtual assistant may be prevented from using outdated ontology information.

X. User Identification Service

There are numerous situations in which a user's identity may need to be verified. As one non-limiting example, the user may enter a store and wish to pay for a purchase with a credit card and the store may wish to verify that the user is a legitimate user of the credit card. As another non-limiting example, the user's identity may need to be verified to enter a particular area (e.g., an office building, an airport, a venue such as a concert venue, a sports venue, etc.). As yet another example, the user's identity may need to be verified when the user wishes to perform a bank transaction (e.g., withdraw money, transfer money, deposit money, open an account, close an account, etc.).

In some embodiments, the user's identity may be verified so that personal information stored in the user's profile may be accessed to carry out one or more transactions. As one non-limiting example, the user may enter a store and wish to pay for a purchase with a credit card whose information (e.g., credit card number, expiration date, etc.) is stored in the user's profile. Upon the user's identity being verified, the store may be authorized to access the credit card information stored in the user's profile. In this way the user need not have his/her or credit card with him/her. Examples of personal information stored in the user's profile and that may be accessed to carry out one or more transactions include the user's name, address, bank account information, passport number, driver's license number, account number(s), reservations information, flight information, etc.

In some embodiments, identification information stored in a user's profile may be used to verify the user's identity. As previously described, a user's profile (e.g., user profile 200) may comprise any of numerous types of user identification information. Examples of identification information include login and password information, answers to one or more security questions, information encoding the user's fingerprint(s), information that may be used to identify the user based on the user's voice (e.g., a voice print of the user), information that may be used to identify the user based on an image of the user (e.g., by using face recognition), information that may be used to identify the user based on a retinal scan, and/or any other suitable biometric information that may be used to identify the user. In some embodiments, the identification information may be stored as encrypted data. In some embodiments, a user's identity may be verified based on identification information not stored in a user's profile, for example by accessing any of the above types of identification information from a source or sources other than the user's profile, and/or in any other suitable way, as aspects of the disclosure provided herein are not limited in this respect. For example, in some embodiments, to provide an additional layer of data security, the identification information may be stored at a location different from than the location(s) at which the user's profile is stored.

Identification information stored in a user's profile may be used to verify the user's identity in any of numerous ways. In some embodiments, input obtained from the user and identification information stored in the user's profile may be used to verify the user's identity. In some embodiments, input obtained from the user may be compared directly with identification information stored in the user's profile (e.g., a login-password pair input by a user may be compared directly with a login-password pair stored in the user's profile). In other embodiments, input obtained from the user may be processed to obtain information to use for verifying the user's identity. For example, one or more features may be extracted from input obtained from the user (e.g., one or more features may be extracted from an image of the user, spoken input provided by the user, etc.,) and the user's identity may be verified based on the extracted feature(s) and identification information in the user's profile. As one non-limiting example, a user may provide spoken input (e.g., speak a challenge utterance, a passphrase, etc.) and the user's identity may be verified by using any suitable speaker recognition technique using the spoken input and identification information in the user's profile (e.g., a voiceprint of the user). As another non-limiting example, an image of the user may be taken (e.g., an image of the user's face, a retinal scan, a finger-print, etc.) and the taken image may be compared with identification information in the user's profile (e.g., information used to recognize a user via a face recognition technique based on an image of the user, information encoding the user's fingerprints, information encoding and/or derived from an earlier retinal scan of the user, etc.).

It should be appreciated that verification of a user's identity is not limited to being performed based on only one type of input from the user (e.g., only fingerprint information, only spoken input, only an image for face recognition) and, in some embodiments, may be performed based on multiple types of input from the user so that a user's identity may be verified using multiple techniques (e.g., face recognition and voice recognition, face recognition and fingerprint recognition, and/or any other suitable combination of two or more techniques).

As may be appreciated from the above discussion, in some embodiments, a user's identity may be verified using biometric information (e.g., a user's voice), and information stored in the user profile of the identified user (e.g., credit card information) may be used for performing one or more transactions (e.g., making a purchase with the credit card at a store). Using biometric information to identify a user and access information in the profile of the identified user, allows a user to authorize performance of one or more transactions (e.g., a credit card payment) without using any items to identify himself/herself (e.g., photo id, passport, etc.) and/or items for performing the transaction (e.g., a credit card, an account number, etc.). In this way, a user need not carry any such items with him/her. For example, a user may walk into a store in Tahiti in his/her swimming trunks and rent a car without having his/her passport and credit card with him/her.

Any suitable system may be used to verify the user's identity based on input obtained from the user and identification information stored in the user's profile. In some embodiments, the verification may be performed on one or more devices configured to access identification information stored in the user's profile and input provided by a user (e.g., one or more servers storing the user's profile such as server 110, a portable device storing the user's profile such as portable device 154, one or more servers configured to perform a verification service and configured to communicate with one or more devices storing the user's profile, any suitable combination thereof, etc.). As one illustrative example, a user may wish to use her credit card to make a purchase at a store. To verify her identity as an authorized user of the credit card, the user may provide spoken input such as a passphrase. The spoken input and information identifying the user's alleged identity (e.g., the user says she is "Mary Smith") may be provided to an Internet-accessible server configured to perform a verification service. The server may access information in the profile of "Mary Smith," which may be stored on the server and/or another device, and determine whether the user is Mary Smith based on identification information in the accessed profile and the spoken passphrase.

In some embodiments, a transaction authorization system may interact with a user to help the user perform one or more transactions (e.g., make a purchase, perform a bank transaction, etc.). This may be done in any suitable way. In some embodiments, a transaction authorization system may request that a user identify himself/herself and, in response, the user may provide the transaction authorization system with information asserting an identity (e.g., a name, a user ID, a particular number such as a social security number, etc.) and identification information that may be used to confirm whether the user is who he/she purports to be. As described above, the user may provide any suitable identification information to the transaction authorization system, (e.g., the user may speak one or more utterances to be identified by his/her voice, provide a fingerprint, provide any other suitable biometric identification information, provide an PIN code, and/or provide any other suitable identification information).

In some embodiments, the transaction authorization system may obtain explicit permission from the user to access information associated with the user (e.g., credit card information, bank account information, etc.). For example, the transaction authorization system may prompt the user to provide permission for the transaction authorization system to access information associated with the user (e.g., information stored in the user's profile) and the user may provide input indicating that the transaction authorization system may access information about the user. In some embodiments, the transaction authorization system may notify the user that, after the user is identified, the transaction authorization system will access information associated with the user (e.g., the user's credit card information, bank account information, etc.).

In some embodiments, after the user provides information asserting an identity (e.g., asserting the user is "Mary Smith") and identification information (e.g., a spoken utterance for voice identification), the transaction authorization system may access the profile of a user associated with the asserted identity (e.g., the profile of a user named "Mary Smith") and compares identification information stored in the accessed profile with the identification information provided by the user asserting to be Mary Smith. Accordingly, a user's identity may be verified based on information in the user's profile and the identification information provided by the user to the transaction authorization system. The transaction authorization system may access the profile of a user in any suitable way, for example, by communicating with computing device that has access to user profile information, such as server 110 described with reference to FIG. 1.

When the user's identity is not verified successfully (e.g., identification information provided does not match identification information stored in a profile of a user whose identity is being asserted), the transaction authorization system may deny approval to perform the desired transaction. On the other hand, when the user's identity is successfully verified, the transaction authorization system may access, in the user's profile, information to be used for performing the transaction (e.g., bank account information, credit card information, social security number, driver's license number, address, and/or any other suitable information that may be used for carrying out the transaction).

In some embodiments, information to be used for performing the transaction may be validated by the transaction authorization system. As one non-limiting example, the transaction authorization system may verify whether a credit card number is valid. As another non-limiting example, the transaction authorization system may verify whether a bank account is valid and/or has at least a certain balance. When it is determined that the information to be used for performing the transaction is not valid, the transaction authorization system may deny approval to perform the desired transaction. On the other hand, when it is determined that the information to be used for performing the transaction is valid, the transaction may be approved.

In some embodiments, the transaction authorization system may comprise one or multiple computing devices, in one or multiple locations (e.g., one or more computing devices at a store connected to one or more servers via a network). As one non-limiting example, the transaction authorization system may comprise one or more servers configured to communicate with one or more computing devices storing user profiles and one or more computing devices (e.g., computing devices at stores, banks, etc.) configured to communicate with the server(s).

XI. Device-Dependent Behavior

In some embodiments, a virtual assistant may customize its behavior based on one or more characteristics of the device on which it is executing. For example, a virtual assistant executing on one device (e.g., a laptop) and another virtual assistant executing on another device (e.g., a mobile phone) may behave differently when interacting with the same user. As one non-limiting example, a virtual assistant may invoke different applications for performing the same task on different devices (e.g., may invoke different music reproduction programs, different web-browser programs, etc.). As another non-limiting example, a virtual assistant may provide a user with a different amount of graphical output (e.g., none, some, etc.) depending on the amount of display space available on the device (e.g., the virtual assistant may provide more graphical output on a laptop than on a mobile device). As yet another non-limiting example, a virtual assistant may change the content of responses it provides to users. For instance, in response to the user asking "what do you dream of," a virtual assistant executing on a mobile device may answer "I have nightmares about being dropped in a toilet" and a virtual assistant executing on TV may answer "I dream of being a Hollywood star."

In some embodiments, a device (e.g., a car infotainment system) may have access to information about each user in a group of two or more users of the device (e.g., information about family members that may ride in the car) and may customize its behavior when interacting with a particular user in the group of users based at least in part on accessed information about that particular user. As one non-limiting example, the device may be configured to provide a user with personalized content based on information specifying content the user enjoys. For example, a car infotainment system may have access to information about media content (e.g., movie, music, TV show, radio show, etc.) enjoyed by each member of a family (e.g., children, parents, grandparents etc.) and may provide media content to each family member that they might enjoy. For instance, the car infotainment system may show a children's television program that children in the family enjoy to passengers seated in the back of the car, as the passengers in the back of the car may be children.

XII. Additional Implementation Details

An illustrative implementation of a computer system 1200 that may be used in connection with any of the embodiments of the disclosure provided herein is shown in FIG. 12. The computer system 1200 may include one or more processors 1210 and one or more articles of manufacture that comprise non-transitory computer-readable storage media (e.g., memory 1220 and one or more non-volatile storage media 1230). The processor 1210 may control writing data to and reading data from the memory 1220 and the non-volatile storage device 1230 in any suitable manner, as the aspects of the disclosure provided herein are not limited in this respect. To perform any of the functionality described herein, the processor 1210 may execute one or more processor-executable instructions stored in one or more non-transitory computer-readable storage media (e.g., the memory 1220), which may serve as non-transitory computer-readable storage media storing processor-executable instructions for execution by the processor 1210.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (FIGS. 4, 5, 6, 8A-8B, 9, and 11A-11B) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A mobile device, comprising:
   at least one computer-readable storage medium configured to store user profile information of a user of the mobile device; and
   at least one processor, coupled to the at least one computer-readable storage medium, programmed to perform:
      providing a second device, which is programmed to execute a first virtual assistant, with access to at least some of the user profile information, the first virtual assistant being configured to customize, based on the at least some user profile information, its behavior when interacting with the user;
      determining whether performance of a task being performed at least in part by the mobile device is to be continued, at least in part, by using the second device instead of the mobile device; and
      when it is determined that the performance of the task is to be continued at least in part by using the second device, providing the second device with access to information related to the task,
      wherein the user profile information specifies a virtual assistant persona, and
      wherein providing the second device with access to the at least some user profile information comprises providing the second device with access to information specifying the virtual assistant persona, the first virtual assistant being configured to adopt the virtual assistant persona when interacting with the user.

2. The mobile device of claim 1, wherein the mobile device is programmed to establish a direct wireless communication channel with the second device and provide the second device with access to at least some of the user profile information via the direct wireless communication channel.

3. The mobile device of claim 1, wherein the at least one processor is further programmed to perform:
   executing a second virtual assistant programmed to customize, based on at least some user profile information, its behavior when interacting with the user.

4. The mobile device of claim 1, wherein the at least one processor is further programmed to perform:
   determining whether the second device has authorization to access the user profile; and
   providing the second device with access to the at least some information in the user profile only when it is determined that the second device has authorization to access the user profile.

5. The mobile device claim 1, wherein the at least a portion of the at least some user profile information at least partially specifies at least one of a voice font and a speaking style.

6. A method performed by a mobile device, the mobile device programmed to store user profile information of a user of the mobile device, the method comprising:
   providing a second device, which is programmed to execute a first virtual assistant, with access to at least some of the user profile information, the first virtual assistant being configured to customize, based on the at least some user profile information, its behavior when interacting with the user;
   determining whether performance of a task being performed at least in part by the mobile device is to be continued, at least in part, by using the second device instead of the mobile device; and
   when it is determined that the performance of the task is to be continued at least in part by using the second device, providing the second device with access to information related to the task
   wherein the user profile information specifies a virtual assistant persona, and
   wherein providing the second device with access to the at least some user profile information comprises providing the second device with access to information specifying the virtual assistant persona, the first virtual assistant being configured to adopt the virtual assistant persona when interacting with the user.

7. The method of claim 6, further comprising:
   establishing a direct wireless communication channel between the mobile device and the second device and providing the second device with access to at least some of the user profile information via the direct wireless communication channel.

8. The method of claim 6, further comprising:
   executing, on the mobile device, a second virtual assistant programmed to customize, based on at least some user profile information, its behavior when interacting with the user.

9. The method of claim 6, further comprising:
   determining whether the second device has authorization to access the user profile; and
   providing the second device with access to the at least some information in the user profile only when it is determined that the second device has authorization to access the user profile.

10. The method of claim 6, wherein the at least a portion of the at least some user profile information at least partially specifies at least one of a voice font and a speaking style.

11. At least one non-transitory computer-readable storage medium storing processor-executable instructions that, when executed by a mobile device programmed to store user profile information of a user of the mobile device, cause the mobile device to perform a method comprising:

providing a second device, which is programmed to execute a first virtual assistant, with access to at least some of the user profile information, the first virtual assistant being configured to customize, based on the at least some user profile information, its behavior when interacting with the user;

determining whether performance of a task being performed at least in part by the mobile device is to be continued, at least in part, by using the second device instead of the mobile device; and when it is determined that the performance of the task is to be continued at least in part by using the second device, providing the second device with access to information related to the task, wherein the user profile information specifies a virtual assistant persona, and wherein providing the second device with access to the at least some user profile information comprises providing the second device with access to information specifying the virtual assistant persona, the first virtual assistant being configure to adopt the virtual assistant persona when interacting with the user.

12. The at least one non-transitory computer-readable storage medium of claim 11, wherein the method further comprises:

establishing a direct wireless communication channel between the mobile device and the second device and providing the second device with access to at least some of the user profile information via the direct wireless communication channel.

13. The at least one non-transitory computer-readable storage medium of claim 11, wherein the method further comprises:

executing, on the mobile device, a second virtual assistant programmed to customize, based on at least some user profile information, its behavior when interacting with the user.

14. The at least one non-transitory computer-readable storage medium of claim 11, wherein the method further comprises:

determining whether the second device has authorization to access the user profile; and providing the second device with access to the at least some information in the user profile only when it is determined that the second device has authorization to access the user profile.

15. The at least one non-transitory computer-readable storage medium of claim 11, wherein the at least a portion of the at least some user profile information at least partially specifies at least one of a voice font and a speaking style.

* * * * *